United States Patent
Steinebach et al.

(10) Patent No.: US 10,407,011 B2
(45) Date of Patent: Sep. 10, 2019

(54) CAST BUMPER SYSTEM AND METHOD OF MANUFACTURING SAME

(71) Applicants: Edward Karl Steinebach, Oak Ridge, TN (US); Jeremiah John Brady, Knoxville, TN (US); Jeffrey Jay Mellis, Bloomfield Hills, MI (US); Richard Lee Winfree, Knoxville, TN (US); Mark Justin Jones, Knoxville, TN (US); Darren Andrew Womack, Windsor (CA)

(72) Inventors: Edward Karl Steinebach, Oak Ridge, TN (US); Jeremiah John Brady, Knoxville, TN (US); Jeffrey Jay Mellis, Bloomfield Hills, MI (US); Richard Lee Winfree, Knoxville, TN (US); Mark Justin Jones, Knoxville, TN (US); Darren Andrew Womack, Windsor (CA)

(73) Assignee: MAGNA INTERNATIONAL INC., Aurora (CA)

( * ) Notice: Subject to any disclaimer, the term of this patent is extended or adjusted under 35 U.S.C. 154(b) by 25 days.

(21) Appl. No.: 15/784,113

(22) Filed: Oct. 14, 2017

(65) Prior Publication Data
US 2018/0037179 A1 Feb. 8, 2018

Related U.S. Application Data

(63) Continuation-in-part of application No. 15/386,135, filed on Dec. 21, 2016, which is a
(Continued)

(51) Int. Cl.
*B60R 19/18* (2006.01)
*B60R 19/34* (2006.01)
(Continued)

(52) U.S. Cl.
CPC .............. *B60R 19/18* (2013.01); *B22D 25/02* (2013.01); *B23K 31/02* (2013.01); *B60R 19/023* (2013.01);
(Continued)

(58) Field of Classification Search
CPC ....... B60R 19/02; B60R 19/023; B60R 19/03; B60R 19/18; B60R 19/26; B60R 19/34
(Continued)

(56) References Cited

U.S. PATENT DOCUMENTS 5,785,367 A * 7/1998 Baumann ................ B60R 19/18
293/133
5,969,548 A 10/1999 Knapp
(Continued)

FOREIGN PATENT DOCUMENTS

EP 1640147 A1 3/2006
EP 2284045 A1 2/2011
(Continued)

OTHER PUBLICATIONS

International Search Report; PCT/US2018/55783; dated Dec. 31, 2018; 9 pages.

*Primary Examiner* — Jason S Daniels
(74) *Attorney, Agent, or Firm* — Dickinson Wright PLLC

(57) ABSTRACT

A bumper system including a bumper beam being cast from metal having a front panel and a back panel, extending between a first bumper beam end and a second bumper beam end. A plurality of reinforcing ribs integrally cast with the bumper beam extends between the front panel and the back panel defining a non-uniform cross-sectional profile along a portion of the bumper beam. The front panel includes a front center portion disposed between a pair of front side portions. The back panel includes a back center portion disposed between a pair of back side portions. The front center portion
(Continued)

has a front center portion thickness greater than a back center portion thickness. Each of the front side portions has a front side portion thickness being less than a back side portion thickness of adjacent one of the back side portions. Method of manufacturing the bumper system is provided.

21 Claims, 17 Drawing Sheets

Related U.S. Application Data continuation-in-part of application No. 15/319,878, filed as application No. PCT/US2015/039596 on Jul. 8, 2015.

(60) Provisional application No. 62/022,366, filed on Jul. 9, 2014.

(51) Int. Cl.
| | |
|---|---|
| *B60R 19/02* | (2006.01) |
| *B22D 25/02* | (2006.01) |
| *B23K 31/02* | (2006.01) |
| *B60R 19/03* | (2006.01) |
| *B23K 101/00* | (2006.01) |
| *B23K 101/28* | (2006.01) |
| *B23K 103/04* | (2006.01) |
| *B23K 103/08* | (2006.01) |
| *B23K 103/18* | (2006.01) |
| *B23K 103/20* | (2006.01) |

(52) U.S. Cl.
CPC ............. *B60R 19/03* (2013.01); *B60R 19/34* (2013.01); *B23K 2101/006* (2018.08); *B23K 2101/28* (2018.08); *B23K 2103/04* (2018.08); *B23K 2103/15* (2018.08); *B23K 2103/18* (2018.08); *B23K 2103/20* (2018.08); *B60R 2019/1813* (2013.01)

(58) Field of Classification Search
USPC .................................................. 293/132, 133
See application file for complete search history.

(56) References Cited

U.S. PATENT DOCUMENTS

| | | | |
|---|---|---|---|
| 6,318,775 | B1 | 11/2001 | Heatherington et al. |
| 7,390,038 | B2 | 6/2008 | Campbell et al. |
| 7,837,230 | B2 | 11/2010 | Mellis et al. |
| 7,959,197 | B2 | 6/2011 | Agrahari et al. |
| 9,156,417 | B2 * | 10/2015 | Mori ....................... B60R 19/34 |
| 2003/0057692 | A1 | 3/2003 | Horsch et al. |
| 2005/0104392 | A1 | 5/2005 | Liebhard et al. |
| 2007/0056819 | A1 | 3/2007 | Kano et al. |
| 2007/0114804 | A1 | 5/2007 | Gross et al. |
| 2007/0271793 | A1 | 11/2007 | Mellis et al. |
| 2008/0012386 | A1 | 1/2008 | Kano et al. |
| 2008/0308196 | A1 | 12/2008 | Chung |
| 2009/0026799 | A1 | 1/2009 | Garilov |
| 2010/0126813 | A1 | 5/2010 | Hayashi |
| 2011/0187135 | A1 | 8/2011 | Kano et al. |
| 2012/0025547 | A1 | 2/2012 | Haneda et al. |
| 2012/0205927 | A1 | 8/2012 | Asakawa et al. |
| 2013/0157073 | A1 | 6/2013 | Charest et al. |
| 2013/0234456 | A1 | 9/2013 | Brockhoff et al. |
| 2017/0106822 | A1 | 4/2017 | Steinebach et al. |
| 2017/0182960 | A1 * | 6/2017 | Nakajima ............... B60R 19/18 |
| 2017/0203707 | A1 | 7/2017 | Fuerst et al. |

FOREIGN PATENT DOCUMENTS

| | | |
|---|---|---|
| JP | 2008296716 A | 12/2008 |
| JP | 2010120026 A | 6/2010 |
| JP | 2011179579 A | 9/2011 |
| WO | 2016007661 A1 | 1/2016 |
| WO | 2017021856 A1 | 2/2017 |

* cited by examiner

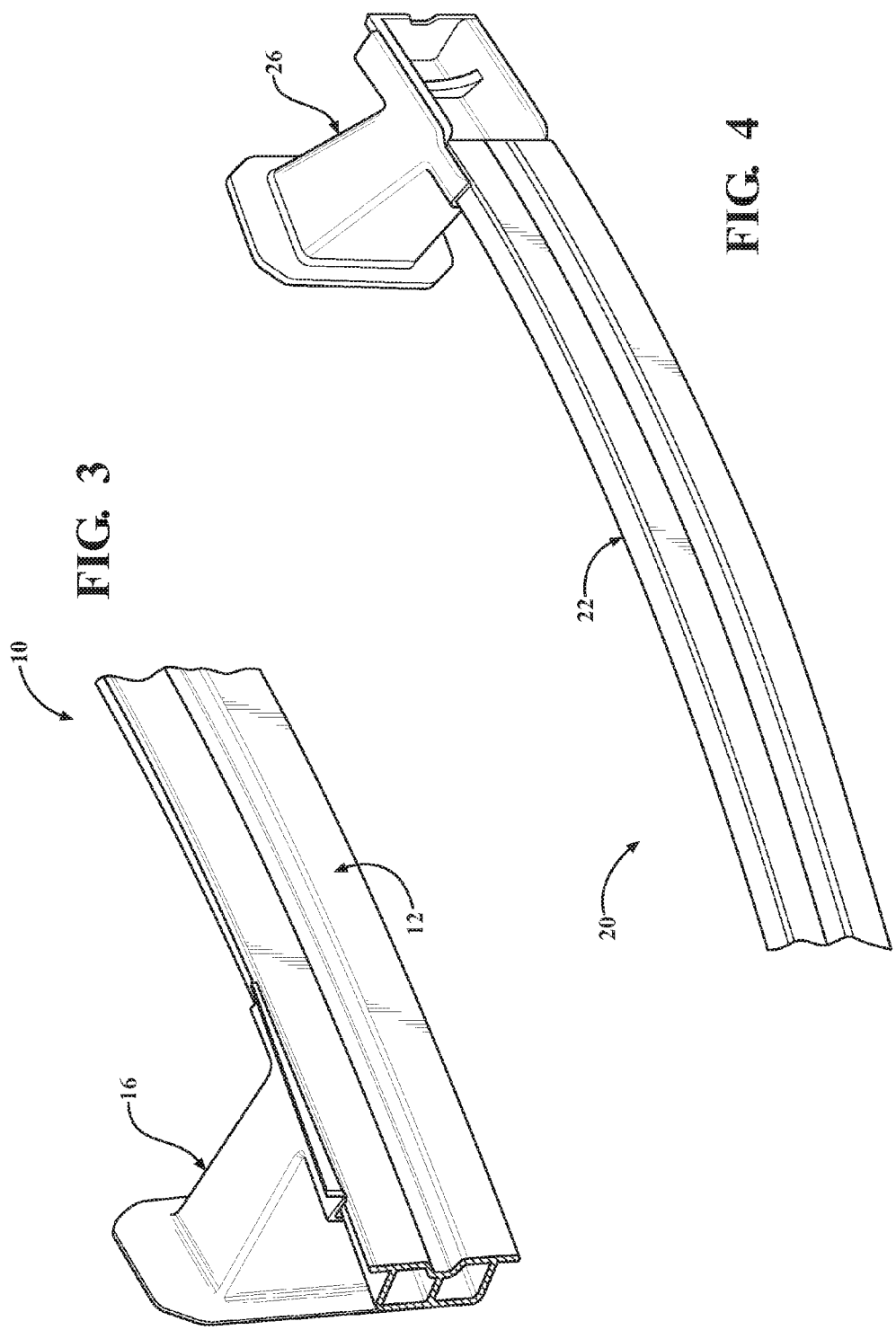

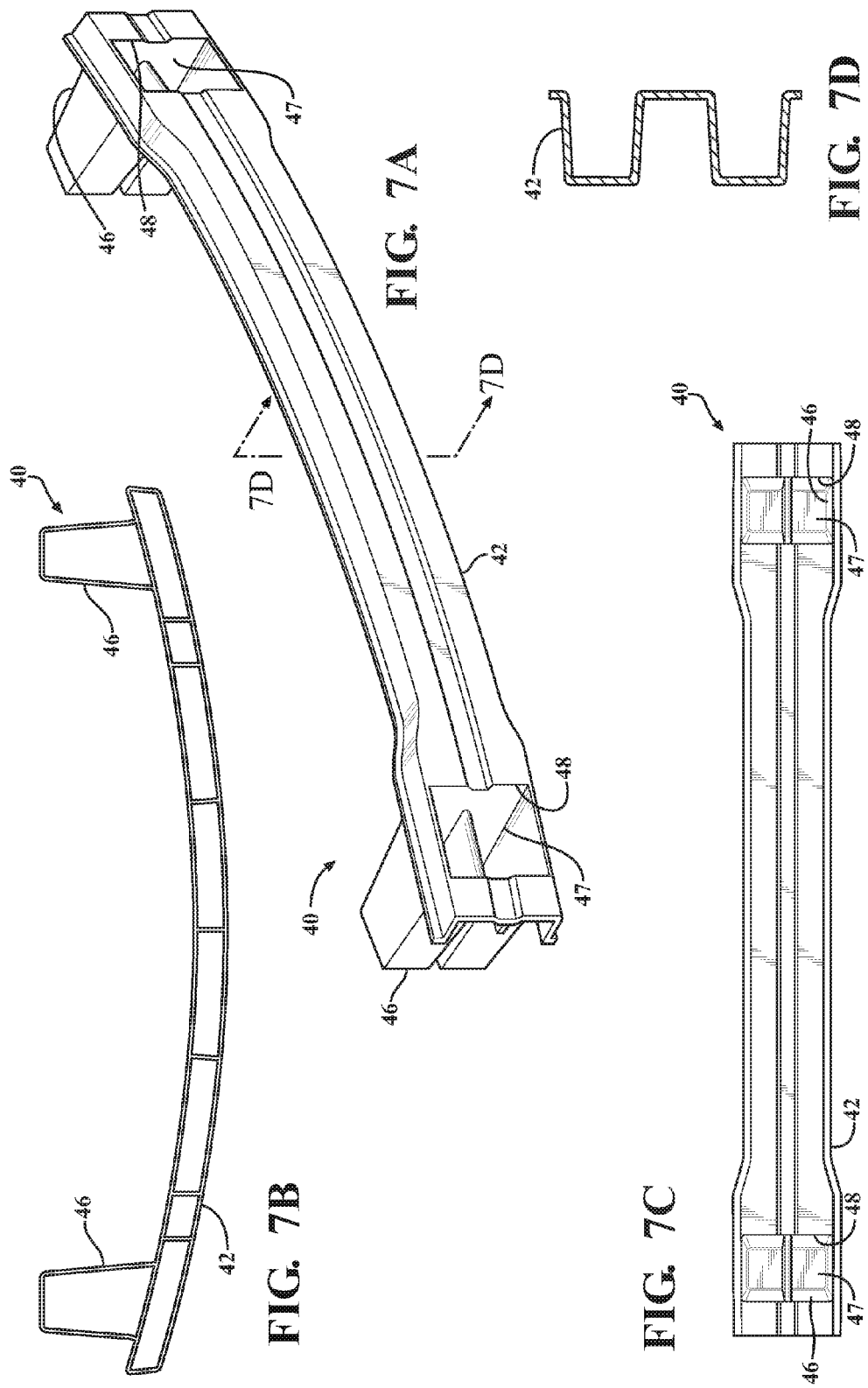

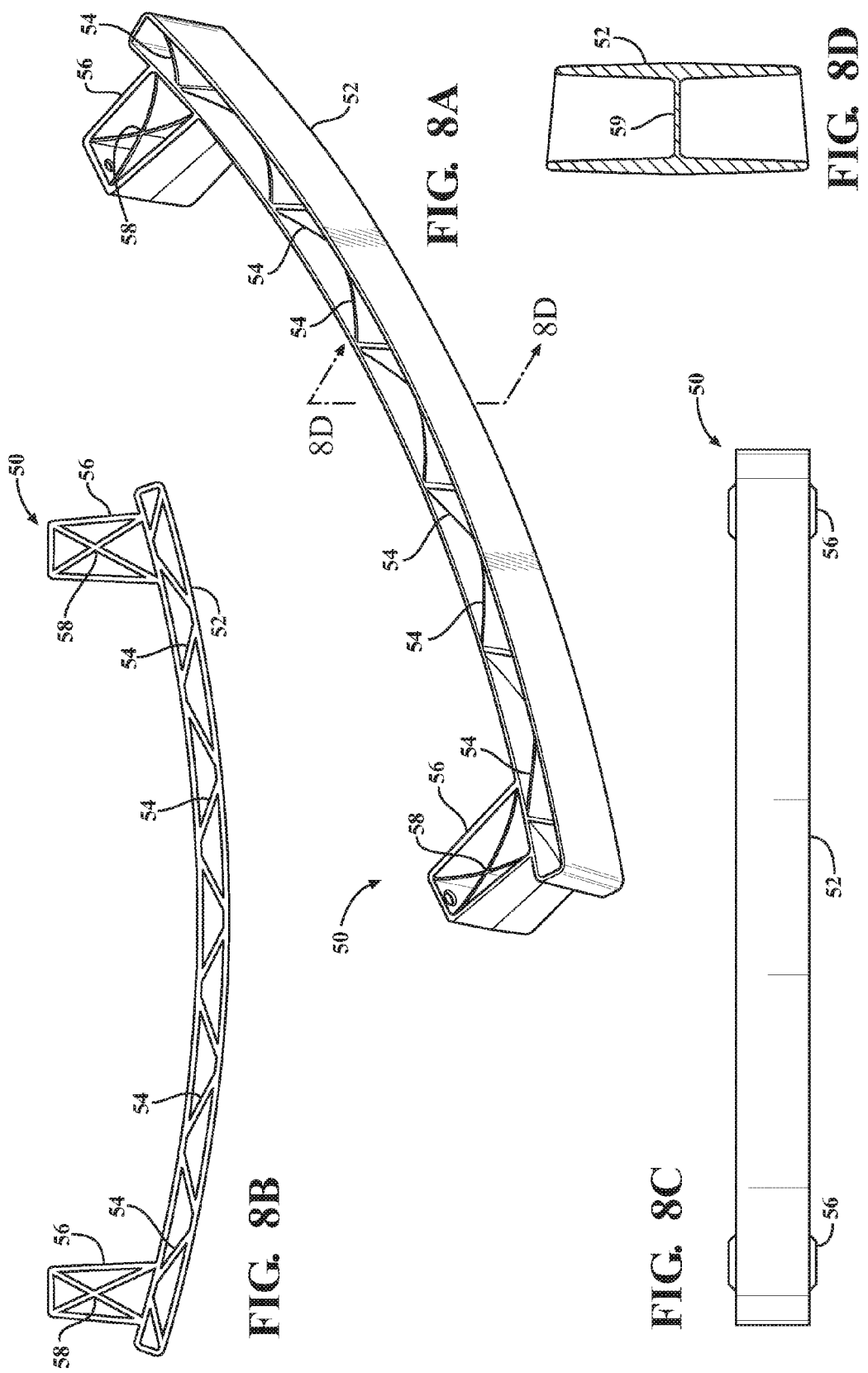

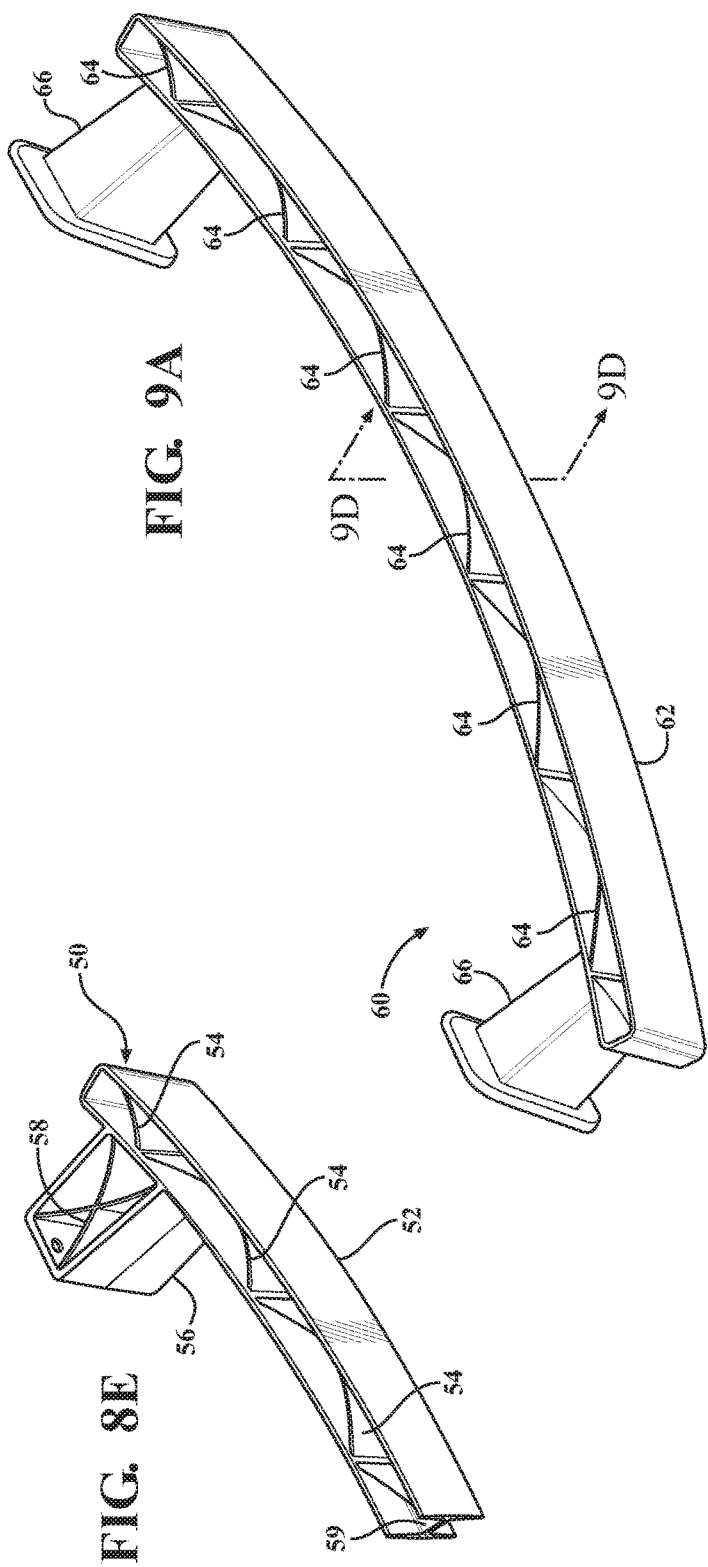
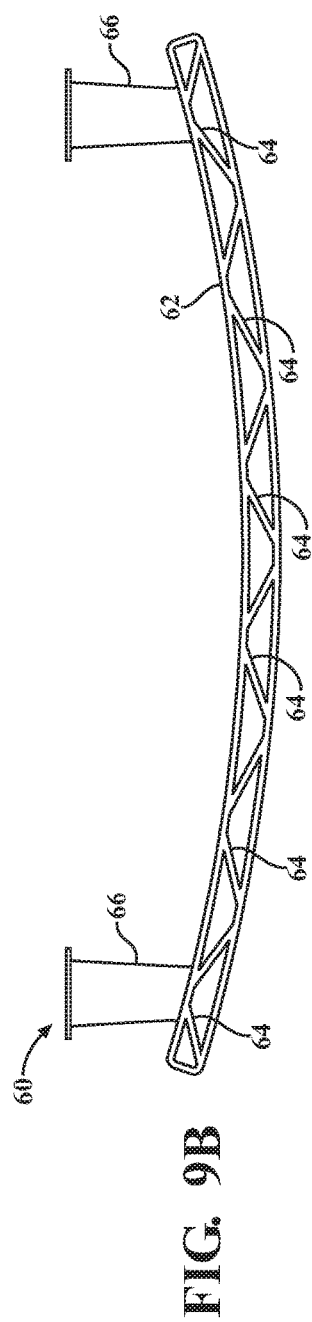

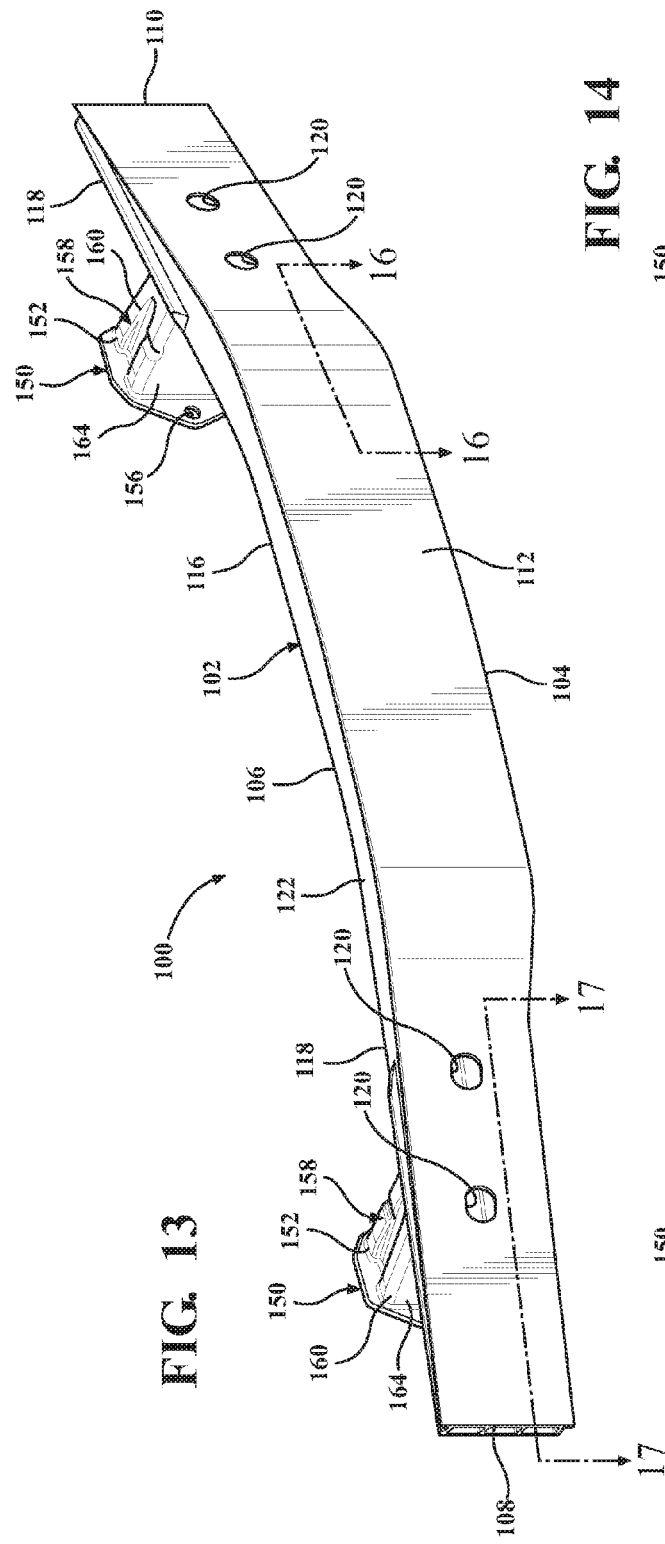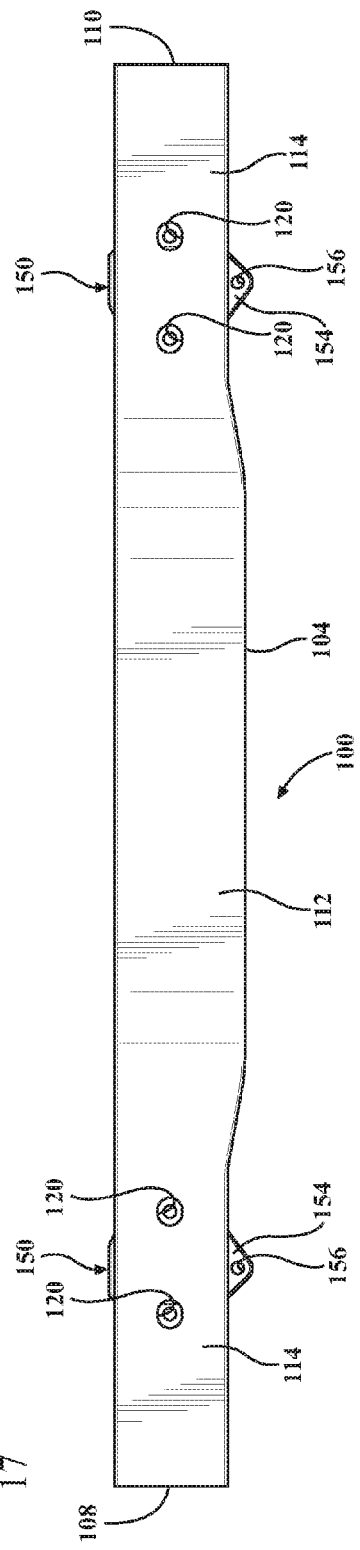

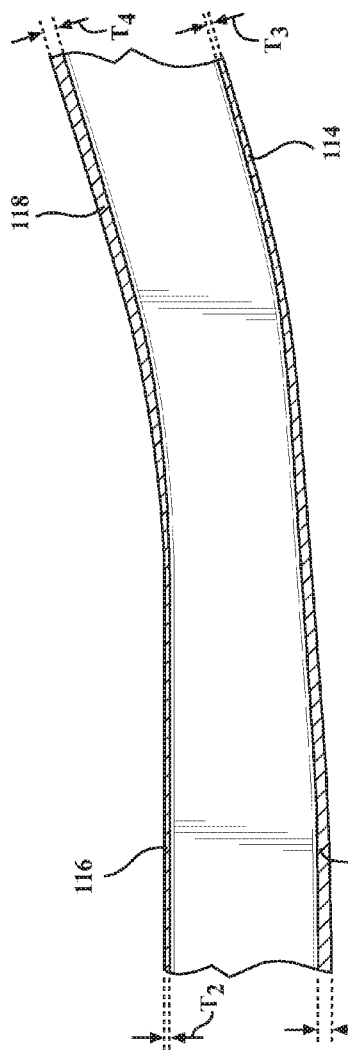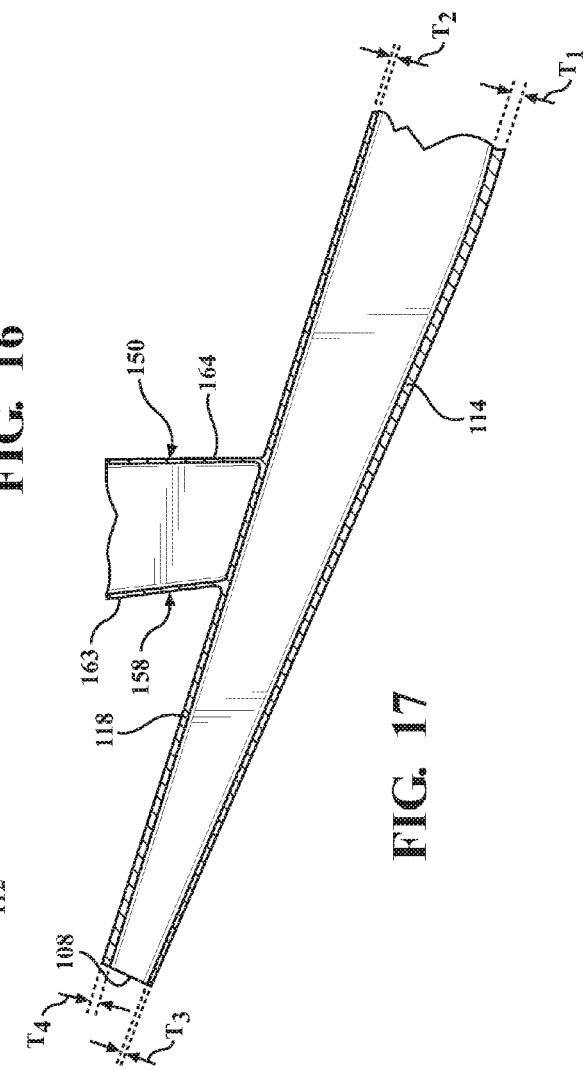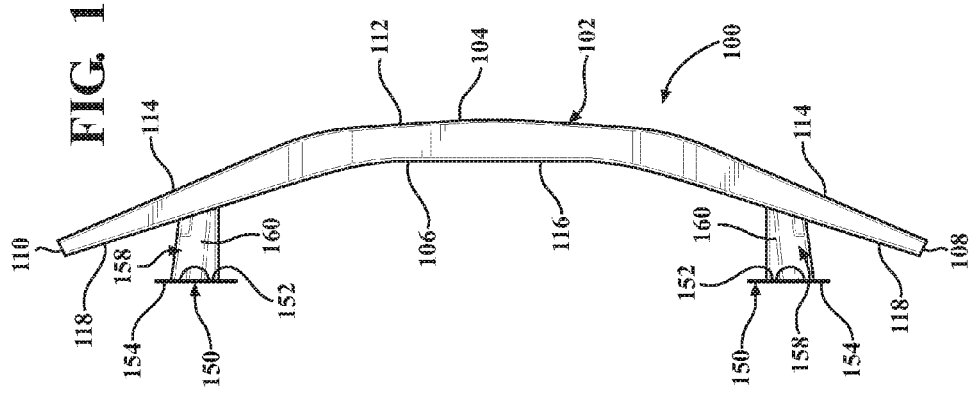

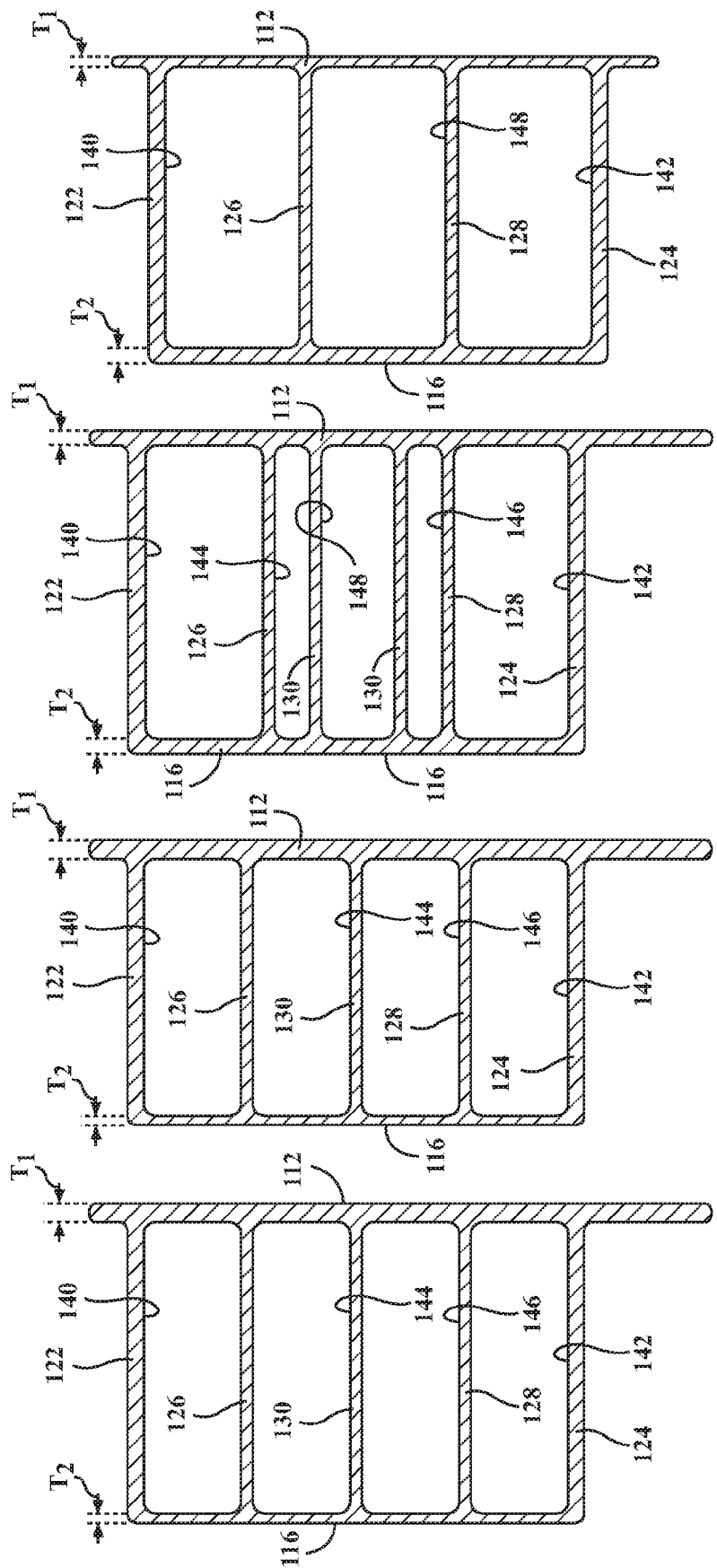

CAST BUMPER SYSTEM AND METHOD OF MANUFACTURING SAME

CROSS REFERENCE TO RELATED APPLICATIONS

This patent application is a Continuation-In-Part of U.S. patent application Ser. No. 15/386,135 filed on Dec. 21, 2016 which is a Continuation-In-Part of U.S. patent application Ser. No. 15/319,878 filed on Dec. 19, 2016, which claims priority to PCT International Patent Application Serial No. PCT/US2015/039596 filed on Jul. 8, 2015, which claims the benefit of and priority to U.S. Provisional Patent Application Ser. No. 62/022,366 filed Jul. 9, 2014, the entire disclosure of these applications being considered part of the disclosure of this application, and hereby incorporated by reference.

BACKGROUND OF THE INVENTION

1. Field of the Invention

The subject invention is related to a vehicle bumper system including a bumper beam and a crash box. The subject invention is also related to a method of manufacturing the bumper system.

2. Description of the Prior Art

Vehicle bumper assemblies are known for providing energy absorbing characteristics. Body structures of a vehicle are provided with so-called crash boxes. Such crash boxes are disposed on the end of a frame member of a vehicle body structure so as to absorb an impact load of certain predetermined value, thereby eliminating deformation of the frame member of the vehicle body.

Bumper assemblies include a bumper beam typically extending laterally across the front or rear of a vehicle and provided generally for absorbing energy during a frontal or rear impact. Such bumper beams are disposed under a cosmetic or fascia bumper and are mounted to a vehicle frame with use of the so-called crash boxes referred to above. The crash-boxes are designed to fold upon such frontal or rear impacts.

The crash boxes are mounted to the vehicle frame and the bumper beam by many different means including, without limitation, welding, adhesives, fasteners, etc. Such crash boxes and bumper beams can be made of many different types of materials including, without limitation, steel, aluminum, and/or magnesium. In addition, such crash boxes and bumper beams are manufactured by way of extrusion, steel roll forming, or hot stamping manufacturing processes.

There remains a significant and continuing need for a design of a crash box and bumper beam that allows for lower manufacturing and assembling costs along with improved energy absorption properties. There also remains a significant and continuing need for an improved method of manufacturing a vehicle bumper system which is cost effective, reduces manufacturing steps, and also able to produce an assembled product having improved energy absorption and other performance properties.

SUMMARY OF THE INVENTION

The subject invention includes a bumper system including a bumper beam being cast from metal and having a front panel and a back panel extending in spaced relationship to one another between a first bumper beam end and a second bumper beam end. A plurality of reinforcing ribs integrally cast with the bumper beam and extends between the front panel and the back panel for providing structural rigidity to the bumper beam. The plurality of reinforcing ribs defines a non-uniform cross-sectional profile along at least a portion of the bumper beam.

The subject invention further includes a bumper system having a bumper beam being cast from metal and having a front panel and a back panel extending in spaced relationship to one another between a first bumper beam end and a second bumper beam end. The front panel of the bumper beam includes a front center portion disposed between a pair of front side portions. The back panel of the bumper beam includes a back center portion disposed between a pair of back side portions. The front center portion has a front center portion thickness greater than a back center portion thickness of the back center portion and each of the front side portions has a front side portion thickness being less than a back side portion thickness of adjacent one of the back side portions.

The subject invention further includes a method for manufacturing a bumper system. The method includes the step of metal casting a bumper beam having a front panel and a back panel extending in spaced relationship to one another between a first bumper beam end and a second bumper beam end and a plurality of reinforcing ribs extending between the front panel and the back panel and defining a non-uniform cross-sectional profile along at least a portion of the bumper beam.

A bumper system or crash box according to the subject invention is advantageous bumper system can be manufactured with variable sections throughout its length whereby the variations can be location of walls, thickness of walls, distance between walls or even the specific number of walls. In addition, the curvature of the bumper beam would be fully variable and not linked to currently predefined manufacturing requirements. Furthermore, crush boxes would be able to fully integrate into the bumper beam as one piece component rather than multiple pieces thereby allowing for engineering optimum deformation resistance in the bumper beam and energy absorption during the crushing of the crush boxes.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a perspective view of a first embodiment of the bumper system illustrating the cast bumper beam secured to a crash box;

FIG. 4 is a perspective view of a second embodiment of the bumper system illustrating a cast crash box secured to a bumper beam;

FIG. 7A is a perspective view of a fourth embodiment of the bumper system including a W-shaped cast bumper beam integral with a cast crash box;

FIG. 7B is a top view of the fourth embodiment of the bumper system;

FIG. 7C is a front view of the fourth embodiment of the bumper system;

FIG. 7D is a cross-sectional view taken along A-A of FIG. 7A;

FIG. 8A is a perspective view of a fifth embodiment of the bumper system including an H-shaped cast bumper beam integral with a cast crash box and each of the cast bumper beam and cast crash box having open top and bottom surfaces;

FIG. 8B is a top view of the fifth embodiment of the bumper system;

FIG. 8C is a front view of the fifth embodiment of the bumper system;

FIG. 8D is a cross-sectional view along B-B of FIG. 8A;

FIG. 8E is a partial perspective view of the fifth embodiment of the bumper system;

FIG. 9A is a perspective view of a sixth embodiment of the bumper system including an H-shaped cast bumper beam integral with a cast crash box having closed top and bottom surfaces;

FIG. 9B is a top view of the sixth embodiment of the bumper system;

FIG. 13 is a perspective view of the ninth embodiment of the bumper system wherein the bumper beam and the crash boxes are made from a casting process;

FIG. 14 is a front view of the ninth embodiment of the bumper system;

FIG. 15 is a top view of the ninth embodiment of the bumper system;

FIG. 16 is a cross-sectional of the ninth embodiment of the bumper system along the lines 16-16 in FIG. 13;

FIG. 17 is a cross-sectional of the ninth embodiment of the bumper system along the lines 17-17 in FIG. 13;

FIG. 19 is a cross-sectional of the bumper beam along the lines 19-19 in FIG. 18;

FIG. 20 is a cross-sectional of the bumper beam along the lines 20-20 in FIG. 18;

FIG. 21 is a cross-sectional of the bumper beam along the lines 21-21 in FIG. 18;

FIG. 22 is a cross-sectional of the bumper beam along the lines 22-22 in FIG. 18;

DESCRIPTION OF THE ENABLING EMBODIMENT

Figure 1:
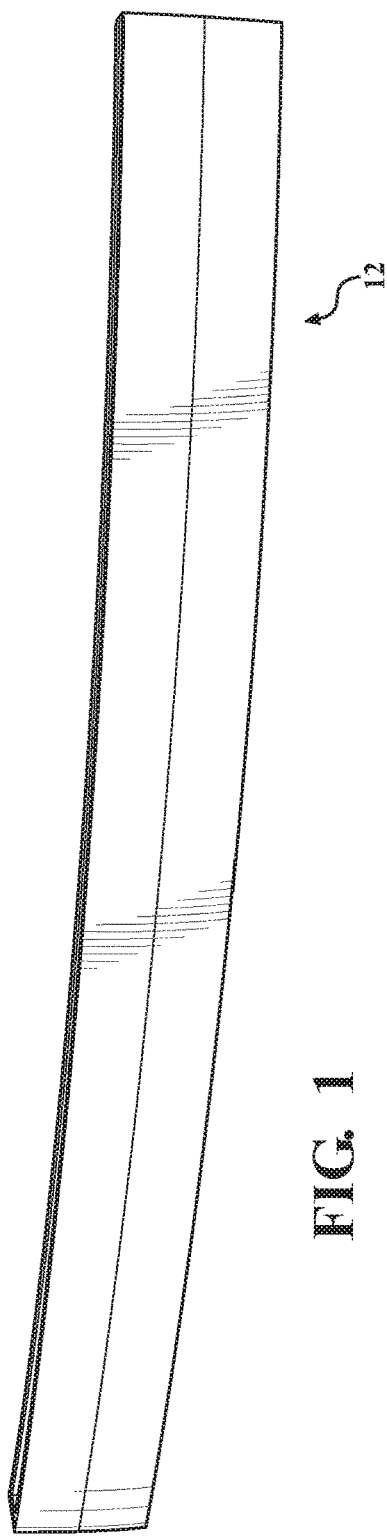
FIG. 1 is a perspective view of a cast bumper beam.

Referring to the Figures, wherein like numerals indicate corresponding parts throughout the several views, FIG. 1 is a perspective view of a cast bumper beam, shown generally at 12, for use in a vehicle bumper system/assembly. Such vehicle bumper assemblies are known for providing energy absorbing characteristics, and the cast bumper beam 12 typically extends laterally across the front or rear of a vehicle (not shown) and is mounted to a vehicle frame with use of the crash boxes. The cast bumper beam 12 is cast from metal materials, such as aluminum or magnesium, and has a specific design of geometry that can be tuned to meet the energy absorbance and weight requirements for the overall bumper system (not expressly shown). However, other types of metal and/or metal alloys may be selected without departing from the scope of the subject disclosure. Although not expressly shown, the cast bumper beam 12 can have variable, non-constant sections with regard to width, geometry, and/or thickness.

Figure 2:
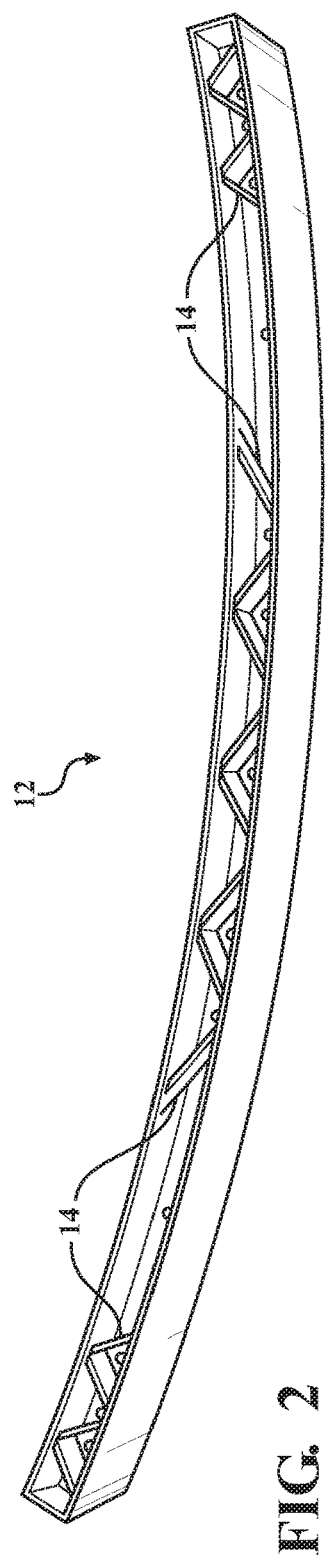
FIG. 2 is a top view of the cast bumper beam illustrating a plurality of reinforcement ribs integrally cast therewith.

As best shown in FIG. 2, the cast bumper beam 12 can include a plurality of reinforcing ribs 14 having a "V" shape that are each cast integrally with the bumper beam 12 and arranged to facilitate controlled crash properties for the overall bumper system (not expressly shown). It should be appreciated that the "V"-shaped reinforcing ribs 14 could also be any number of other shapes depending on the design criteria selected including, without limitation, the amount of structural support desired, weight, and/or the amount of desired crush. As best shown in FIG. 3, the cast bumper beam 12 can be mounted to or combined with a crash box 16 that is manufactured according to traditional manufacturing processes, such as extrusion, steel roll forming, hot stamping, or the like, to form a first embodiment of the bumper system, generally shown at 10. In a preferred arrangement, the cast bumper beam 12 is welded to the crash box 16, however many other different means, including, without limitation, adhesives, fasteners, or the like, can also be used without departing from the scope of the subject disclosure.

FIG. 4 illustrates a second embodiment of the bumper system, shown generally at 20, in which a cast crash box 26 is be mounted to or combined with a bumper beam 22 manufactured according to traditional manufacturing processes, such as extrusion, steel roll forming, hot stamping, or the like. The cast crash box 26 is cast from metal materials, such as aluminum or magnesium, and has a specific design of geometry that can be tuned to meet the energy absorbance and weight requirements for the overall bumper system 20. However, other types of metal and/or metal alloys may be selected without departing from the scope of the subject disclosure. Similar to the first embodiment, the cast crash box 26 can be welded to the bumper beam 22, however many other different means, including, without limitation, adhesives, fasteners, or the like, can also be used without departing from the scope of the subject disclosure.

Figure 5:
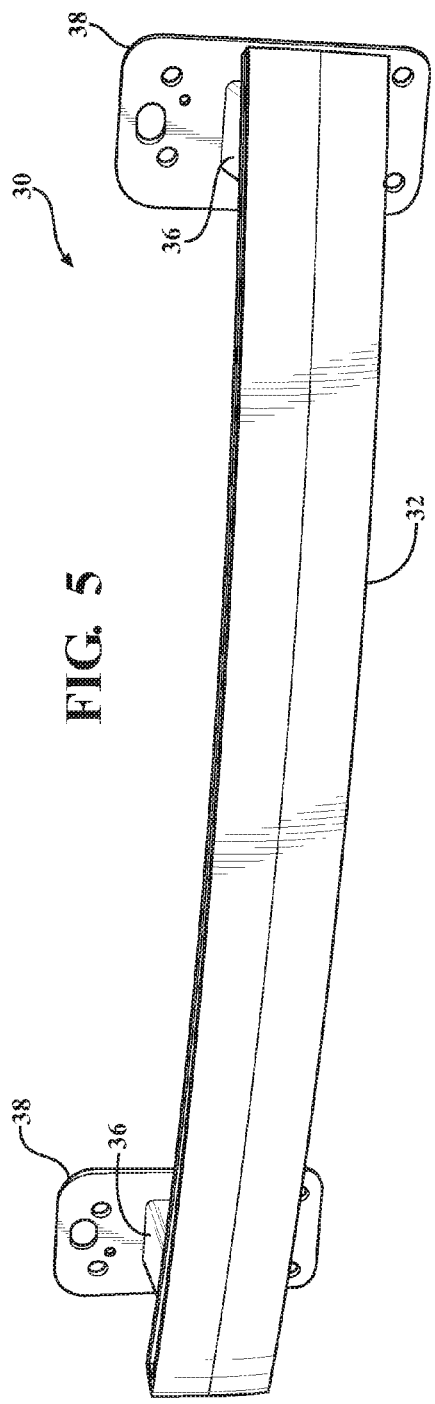
FIG. 5 is a perspective view of a third embodiment of the bumper system illustrating a cast bumper beam integral with a cast crash box.

FIG. 5 illustrates a third embodiment of the bumper system, shown generally at 30, which includes a cast bumper beam 32 integral with a cast crash box 36. Put another way, in the third embodiment of the bumper system 30, the cast bumper beam 32 and the cast crash box 36 are manufacturing integral with one another during the same casting process. Each of the cast bumper beam 32 and the cast crash box 36 are cast from metal materials, such as aluminum or magnesium, however, other types of metal and/or metal alloys may be selected without departing from the scope of the subject disclosure. Each of the cast bumper beam 32 and cast crash box 36 have a specific design of geometry that can be tuned to meet the energy absorbance and weight requirements for the overall bumper system 30, with one or both of these components having variable, non-constant sections with regard to width, geometry, and/or thickness.

Unlike the first and second embodiments of the bumper system 10, 20, the third embodiment of the bumper system advantageously does not require a weld, adhesive, or other fastener to effectuate securement of the cast crash box 36 to the cast bumper beam 32. Accordingly, the third embodiment of the bumper system 30 reduces manufacturing steps and costs, and results in a bumper system that is stronger, cheaper, and lighter over prior art designs. In an exemplary embodiment, the bumper system 30 can be approximately 0.5 kg lighter than prior art bumper system designs.

Figure 6:
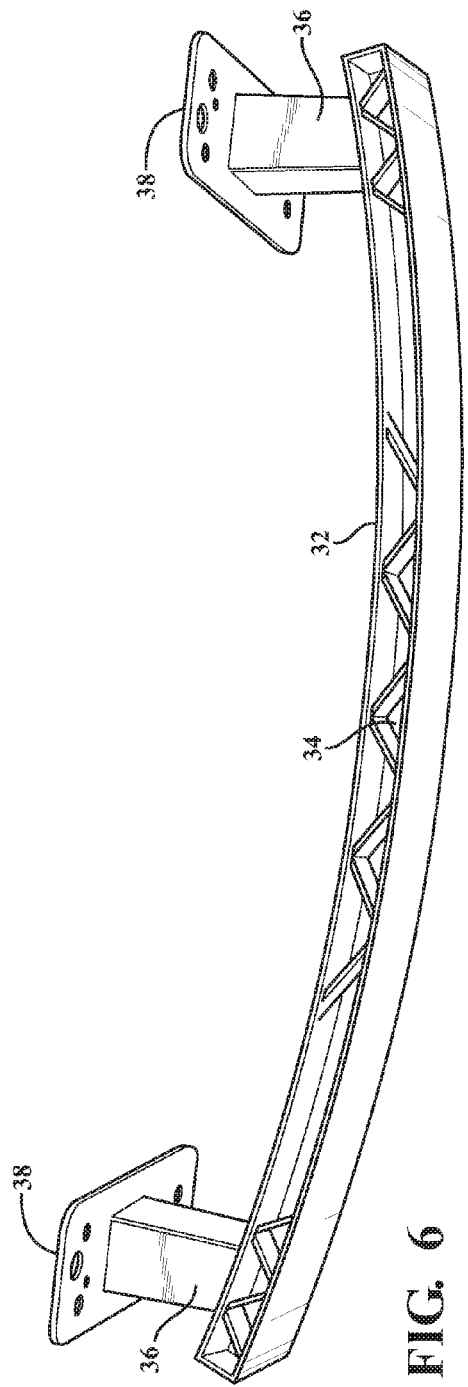
FIG. 6 is a top view of the third embodiment of the bumper system illustrating a plurality of reinforcement ribs integrally cast with the cast bumper beam.

As best shown in FIG. 5, the cast crash box 36 can also include a mounting plate 38 cast integral therewith for use in mounting the bumper system 30 to a vehicle frame (not expressly shown). As best shown in FIG. 6, the cast bumper beam 32 can also include a plurality of reinforcing ribs 34 having a "V" shape that are each cast integrally with the cast bumper beam 32 and arranged to facilitate controlled crash properties for the overall bumper system (not expressly shown). It should be appreciated that the "V"-shaped reinforcing ribs 34 could also be any number of other shapes depending on the design criteria selected including, without limitation, the amount of structural support desired, weight, and/or the amount of desired crush.

FIGS. 7A-7D illustrate a fourth embodiment of the bumper system, shown generally at 40, which includes a cast bumper beam 42 integral with a cast crash box 46. Similar to the third embodiment, the cast bumper beam 42 and the cast crash box 46 of the fourth embodiment of the bumper system 40 are also manufactured integral with one another during the same casting process. Each of the cast bumper beam 42 and the cast crash box 46 are cast from metal materials, such as aluminum or magnesium, however, other types of metal and/or metal alloys may be selected without departing from the scope of the subject disclosure. Each of the cast bumper beam 42 and cast crash box 46 have a specific design of geometry that can be tuned to meet the energy absorbance and weight requirements for the overall bumper system 40, with one or both of these components having variable, non-constant sections with regard to width, geometry, and/or thickness. The fourth embodiment of the bumper system also advantageously does not require a weld, adhesive, or other fastener to effectuate securement of the cast crash box 46 to the cast bumper beam 42. Accordingly, the fourth embodiment of the bumper system 30 reduces manufacturing steps and costs, and results in a bumper system that is stronger, cheaper, and lighter over prior art designs.

As best shown in FIG. 7A, each of the cast crash boxes 46 define an internal cavity 47 and the cast bumper beam 42 defines a plurality of front openings 44 each disposed adjacent to and in communication with a respective internal cavity 47 of the cast crash boxes 46. The incorporation of the front openings 44 into the cast bumper beam 42 improves the manufacturability of the cast bumper system 40. As best shown in FIG. 7D, the cast bumper beam can also be cast to have a "W" shape extending along at least a portion of its length to facilitate controlled crash properties for the bumper system 40.

FIGS. 8A-8E illustrate a fifth embodiment of the bumper system, shown generally at 50, which includes a cast bumper beam 52 integral with a cast crash box 56. Put another way, similar to the third and fourth embodiments, the cast bumper beam 52 and the cast crash box 56 of the fifth embodiment of the bumper system 50 are also manufactured integral with one another during the same casting process. Each of the cast bumper beam 52 and the cast crash box 56 are cast from metal materials, such as aluminum or magnesium, however, other types of metal and/or metal alloys may be selected without departing from the scope of the subject disclosure. Each of the cast bumper beam 52 and the cast crash box 56 have a specific design of geometry that can be tuned to meet the energy absorbance and weight requirements for the overall bumper system 50, with one or both of these components having variable, non-constant sections with regard to width, geometry, and/or thickness. The fifth embodiment of the bumper system 50 also advantageously does not require a weld, adhesive, or other fastener to effectuate securement of the cast crash box 56 to the cast bumper beam 52. Accordingly, the fifth embodiment of the bumper system 50 reduces manufacturing steps and costs, and results in a bumper system that is stronger, cheaper, and lighter over prior art designs.

As best shown in FIGS. 8A and 8D-8E, each of the cast bumper beam 52 and cast crash boxes 56 are open along a top and bottom portion to improve the manufacturability of the cast bumper system 50. As best shown in FIGS. 8A-8B and 8E, the cast bumper beam 52 can include a plurality of reinforcing ribs 54 having a "V" shape that are each cast integrally with the bumper beam 52 and the cast crash boxes 56 can include a plurality of reinforcing ribs 58 having an "X" shape that are each cast integrally with the crash box 56. The reinforcing ribs 54, 58 are arranged to facilitate controlled crash properties for the bumper system 50. It should be appreciated that the "V"-shaped and "X"-shaped reinforcing ribs 54, 58 could also be any number of other shapes depending on the design criteria selected including, without limitation, the amount of structural support desired, weight, and/or the amount of desired crush. As best shown in FIGS. 8D and 8E, the cast bumper beam 52 can also be cast to have an "H" shape and define an additional horizontal or transverse rib 59 extending along at least a portion of the length to further control the crash properties of the bumper system 50.

FIGS. 9A-9E illustrate a sixth embodiment of the bumper system, shown generally at 60, which includes a cast bumper beam 62 integral with a cast crash box 66. Similar to the third, fourth, and fifth embodiments, the cast bumper beam 62 and the cast crash box 66 of the sixth embodiment of the bumper system 60 are manufactured integral with one another during the same casting process. Each of the cast bumper beam 62 and the cast crash box 66 are cast from metal materials, such as aluminum or magnesium, however, other types of metal and/or metal alloys may be selected without departing from the scope of the subject disclosure. Each of the cast bumper beam 62 and cast crash box 66 have a specific design of geometry that can be tuned to meet the energy absorbance and weight requirements for the overall bumper system 60, with one or both of these components having variable, non-constant sections with regard to width, geometry, and/or thickness. The sixth embodiment of the bumper system 60 also advantageously does not require a weld, adhesive, or other fastener to effectuate securement or mounting of the cast crash box 66 to the cast bumper beam 62. Accordingly, the sixth embodiment of the bumper system 60 reduces manufacturing steps and costs, and results in a bumper system that is stronger, cheaper, and lighter over prior art designs.

Figure 9C:
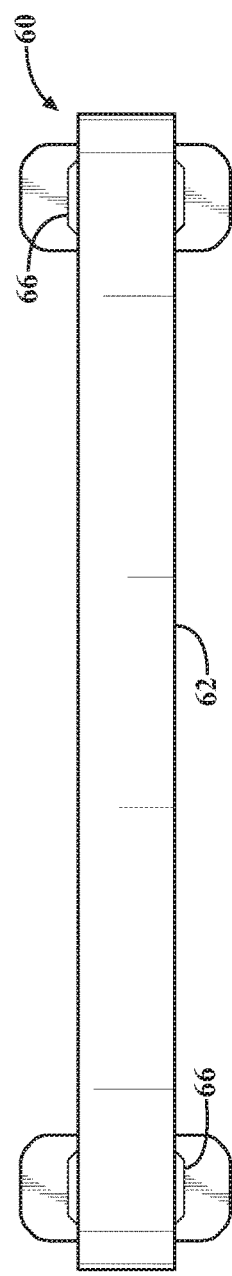
FIG. 9C is a front view of the sixth embodiment of the bumper system.
Figure 9E:
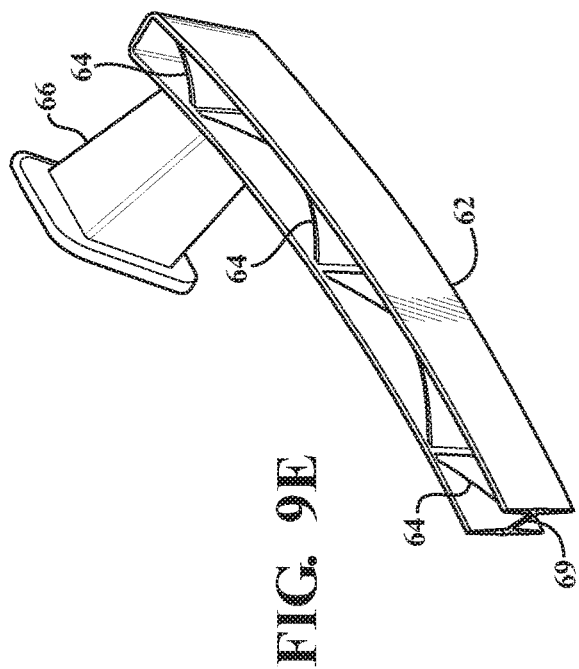
FIG. 9E is a partial perspective view of the sixth embodiment of the bumper system.
Figure 9D:
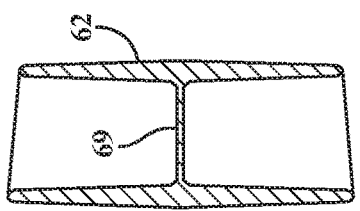
FIG. 9D is a cross-sectional view along C-C of FIG. 8A.

As best shown in FIGS. 9A-9B and 9E, the cast bumper beam 62 is open along a top and bottom portion of the bumper system 60, while the cast crash box 66 is closed along these same portions. As best shown in FIGS. 9A-9B and 9E, the cast bumper beam 62 can include a plurality of reinforcing ribs 64 having a "V" shape that are each cast integrally with the cast bumper beam 62. However, it should be appreciated that the "V"-shaped reinforcing ribs 64 could also be any number of other shapes depending on the design criteria selected including, without limitation, the amount of structural support desired, weight, and/or the amount of desired crush. As best shown in FIGS. 9D and 9E, similar to the fifth embodiment, the cast bumper beam 62 can also be cast to have an "H" shape and define an additional horizontal or transverse rib 69 extending along at least a portion of the length to further control the crash properties of the bumper system 60.

Figure 10A:
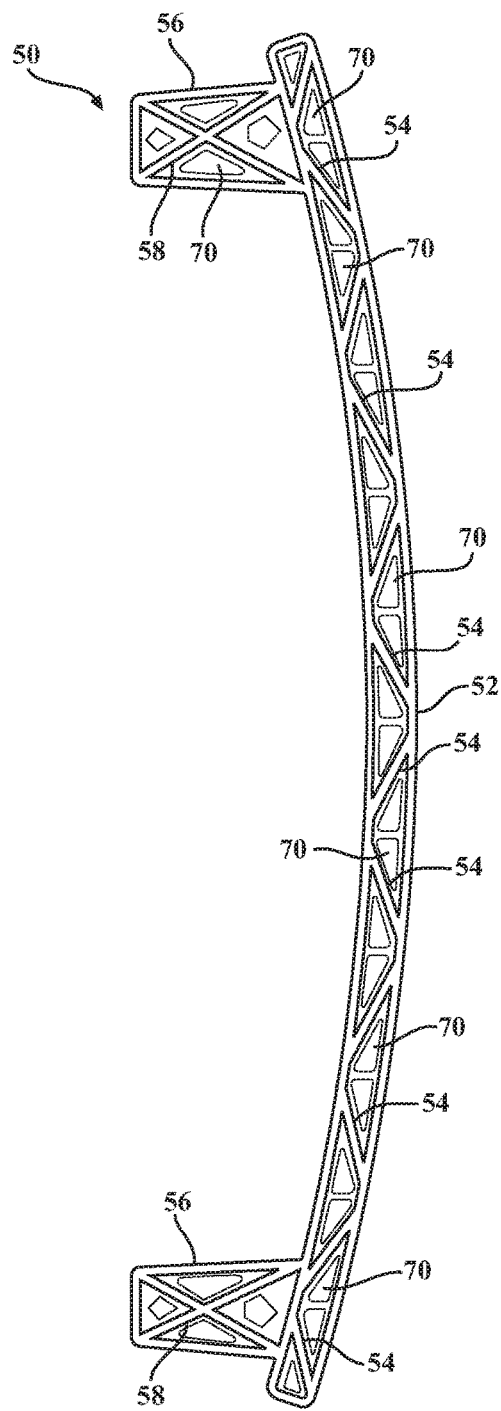
FIG. 10A is a top view of the bumper system shown in FIG. 8A illustrating a plurality of weight reduction holes defined by the H-shaped cast bumper beam and the cast crash box.
Figure 10B:
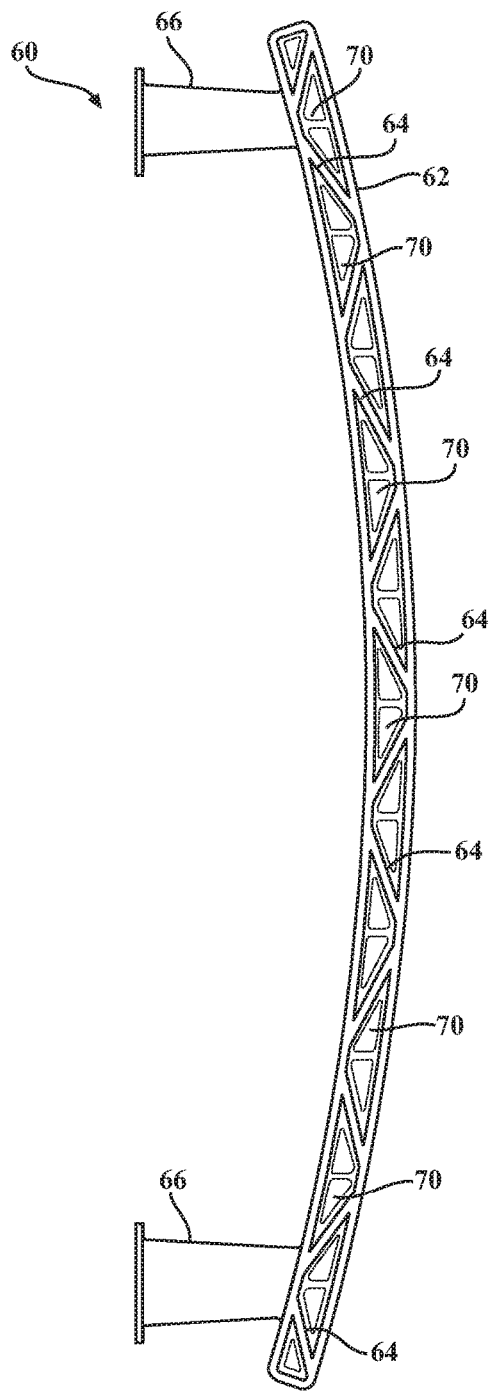
FIG. 10B is a top view of the bumper system shown in FIG. 9A illustrating a plurality of weight reduction holes defined by the H-shaped cast bumper beam.

FIGS. 10A and 10B illustrate an alternative arrangement of the fifth and sixth embodiments of the bumper system 50, 60, respectively, in which the horizontal or transverse rib 59, 69 of the bumper beam 52, 62 defines a plurality of weight reduction holes 70 to further reduce the overall weight of the cast bumper system 50, 60. As shown in FIG. 10A, in the alternative arrangement of the fifth embodiment of the bumper system, the cast crash box 56 can also define a plurality of weight reduction holes to even further reduce the overall weight of the cast bumper system 50.

According to an aspect of the subject disclosure, any of the aforementioned embodiments of the subject bumper system may be manufactured such that they are comprised of multiple grades of alloys at various regions or portions of the metal cast bumper system to allow the bumper system to be efficiently tuned to meet certain vehicle performance requirements. More specifically, as illustrated in FIGS. 11 and 12, the bumper system 70, 80 may be divided into a plurality of regions or portions A, B, C, D, E, F, G with at least two of the regions or portions A, B, C, D, E, F, G comprised of different alloys than one another such that each region or portion A, B, C, D, E, F, G may be specialized and tuned for predetermined performance and mass characteristics.

Figure 11:
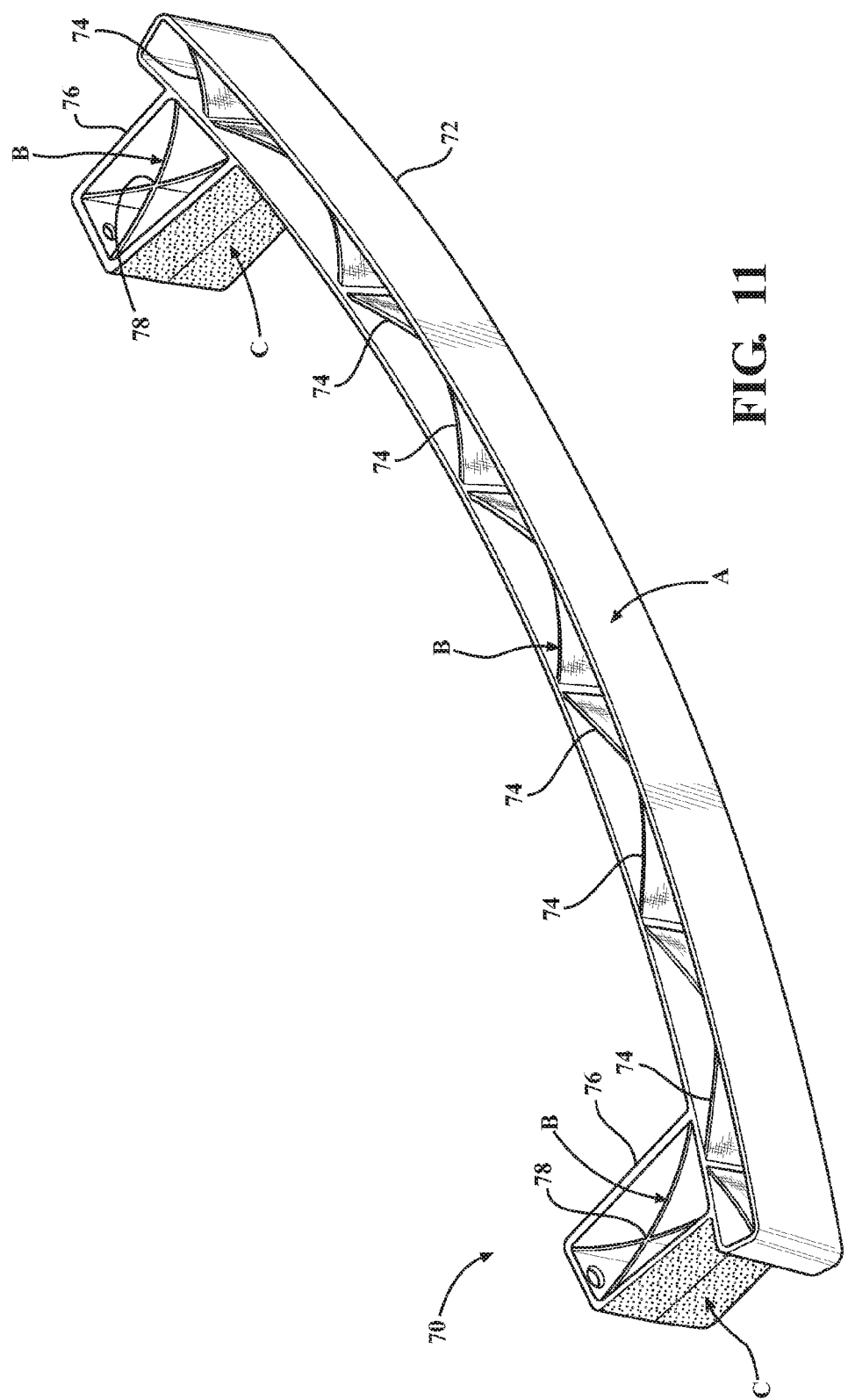
FIG. 11 is a perspective view of a seventh embodiment of the bumper system wherein the bumper system is comprised of several regions or portions each comprised of a different metal alloy.
Figure 12:
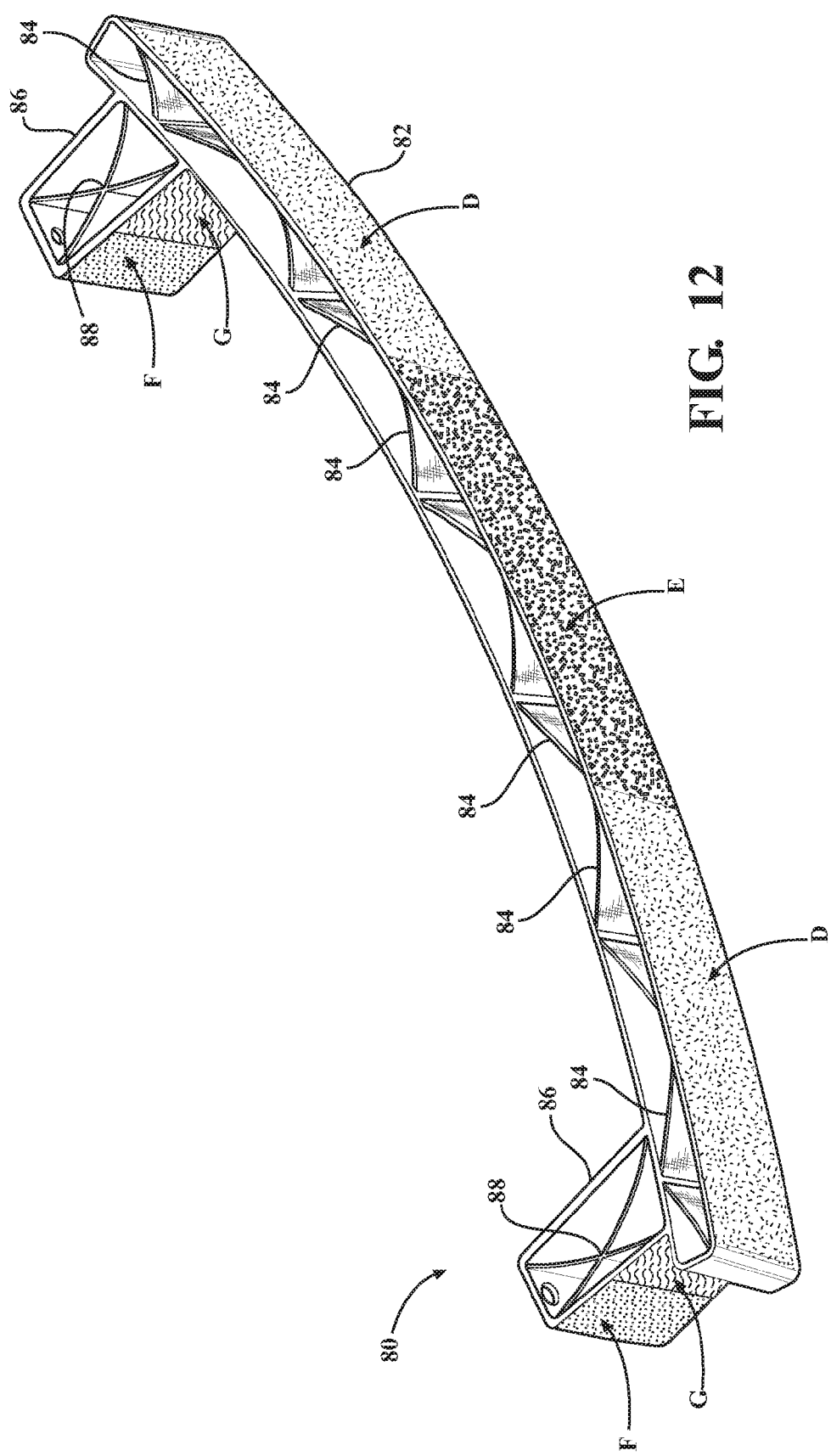
FIG. 12 is a perspective view of an eighth embodiment of the bumper system wherein a cast bumper beam is comprised of at least two regions or portions, a crash box is comprised of at least two regions or portions, and wherein each of the regions or portions are comprised of a different alloy.

In the embodiment of FIG. 11, a metal cast bumper beam 72 makes up the first region A, a plurality of cast reinforcing ribs 74, 78 of the metal cast bumper beam 72 or metal cast crash boxes 76 make up the second region B, and a part of the metal cast crash boxes 76 makes up the third region C. In this example, an alloy that has excellent crush and energy absorbing characteristics can be selected for the second region B (the reinforcing ribs 74, 78), or other parts of the system that will be crushed on impact. Additionally, an alloy that has higher strength can be selected for the first region A (the bumper beam 72), or other parts of the bumper system 70 that are intended to transfer energy instead of absorb energy. As such, FIG. 11 demonstrates that different components of the metal cast bumper system 70 can be comprised of different alloys than one another. It should be appreciated that in this and the other embodiments of the subject invention, the cast bumper beam 72 and crash box 76 may either be integrally connected or non-integrally connected, e.g., mechanically connected, to one another.

Furthermore, individual components of the metal cast bumper system can be comprised of more than one region or portion of different alloys. For example, as illustrated in FIG. 12, the cast bumper beam 82 includes a first bumper beam portion E at a central region of the cast bumper beam 82 and which is comprised of a first bumper beam alloy. The cast bumper beam 82 also includes a second bumper beam portion D that is located at the outer regions of the bumper beam 82 on opposing sides of the central region E, and which is comprised of a second bumper beam alloy. The first and second bumper beam alloys are different than one another to refine and tune the performance characteristics of the metal cast bumper system 80. Furthermore, a pair of cast crash boxes 86 each include a first crash box region F that is located at a rearward region of the crash box 86 and comprised of a first crash box alloy. The pair of cast crash boxed 86 each also include a second crash box region G that is located at a forward region of the crash box 86 between the rearward region F and the bumper beam 82 and comprised of second crash box alloy. The first and second crash box alloys are different than one another as well as the first and second bumper beam alloys to refine and tune the performance characteristics of the metal cast crash boxes 86. As such, the metal cast crash boxes 86 are configured to have different performance characteristics across their lengths.

According to another aspect of the present disclosure, the bumper system 100, as generally shown in FIG. 13, includes a bumper beam 102 with the bumper beam 102 being cast from metal. The bumper beam 102 has a front panel 104 and a back panel 106. The front panel 104 and the back panel 106 extends between a first bumper beam end 108 and a second bumper beam end 110 in a spaced relationship to one another. The front panel 104 and the back panel 106 may be of any shape such as, but not limited to, a rectangular shape. It should be appreciated that a secondary bracket may be attached at the first bumper beam end 108 and the second bumper beam end 110 for the management of narrow offset impact energy.

The front panel 104 of the bumper beam 102 includes a front center portion 112 disposed between a pair of front side portions 114. In other words, the front side portions 114 extend outwardly from the front center portion 112. It should be appreciated that the front side portions 114 may extend outwardly from the front center portion 112 at a first angle of greater than 90° relative to the front center portion 112. The back panel 106 of the bumper beam 102 includes a back center portion 116 disposed between a pair of back side portions 118. In other words, the back side portions 118 extend outwardly from the back center portion 116. It should be appreciated that the back side portions 118 may extend outwardly from the back center portion 116 at a second angle of greater than 90° relative to the back center portions 116 wherein the second angle can be greater than the first angle. As best shown in FIG. 14, each of the front side portions 114 defines a pair of apertures 120, each having a circular shape and spaced from one another, for receiving and securing a vehicle bumper to the bumper beam 102. The front center portion 112 and the front side portions 114 may have a constant shape, e.g., rectangular shape, or a non-constant shape, e.g., rectangular shapes that are different in size.

Figure 18:
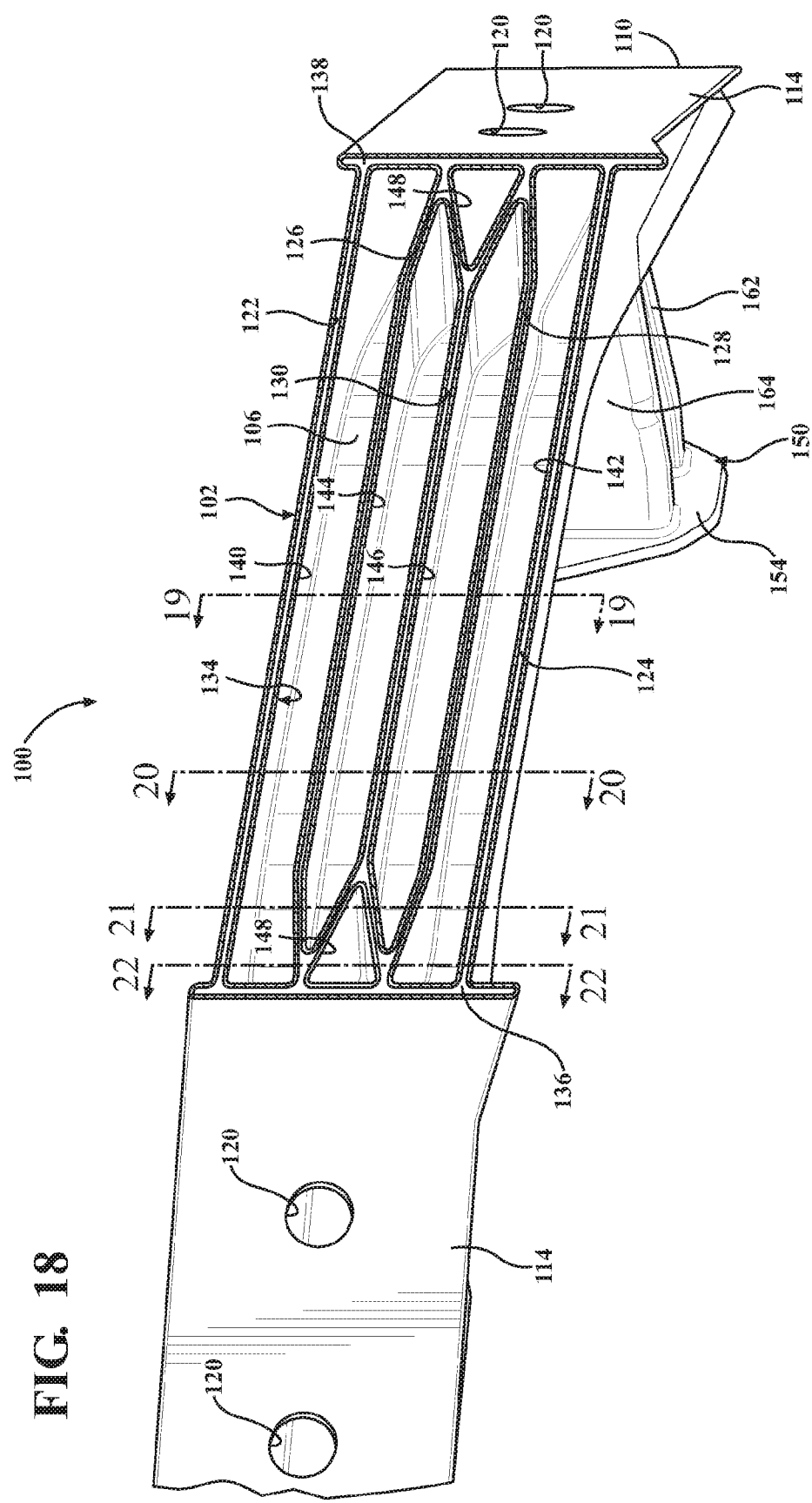
FIG. 18 is a cross-sectional perspective view of the bumper beam of the bumper system showing the plurality of reinforcing ribs.

As best shown in FIG. 18, the bumper beam 102 includes a plurality of reinforcing ribs 122, 124, 126, 128, 130 integrally cast with the bumper beam 102 and extends between the front panel 104 and the back panel 106 for providing structural rigidity to the bumper beam 102. The plurality of reinforcing ribs 122, 124, 126, 128, 130 defines a non-uniform cross-sectional profile 134 along at least a portion of the bumper beam 102. As the plurality of reinforcing ribs 122, 124, 126, 128, 130 extends longitudinally between a first profile end 136 disposed relative to the first bumper beam end 108 and a second profile end 138 disposed relative to the second bumper beam end 110, the plurality of reinforcing ribs 122, 124, 126, 128, 130 defines a plurality of pockets 140, 142, 144, 146, 148 varying in quantity to establish the non-uniform cross-section profile.

The plurality of reinforcing ribs 122, 124, 126, 128, 130 includes a top reinforcing rib 122 and a bottom reinforcing rib 124 disposed in spaced relationship to one another and extending longitudinally and linearly between the first profile end 136 and the second profile end 138. The plurality of reinforcing ribs 122, 124, 126, 128, 130 further includes at least one intermediate rib 126, 128, 130 disposed between the top reinforcing rib 122 and the bottom reinforcing rib 124 and extending longitudinally and non-linearly between the first profile end 136 and the second profile end 138 to define the non-uniform cross-sectional profile 134 taken along a plane disposed perpendicular to the plurality of reinforcing ribs 122, 124, 126, 128, 130 and extending between the first profile end 136 and the second profile end 138.

The at least one intermediate rib 126, 128, 130 includes a plurality of intermediate reinforcing ribs 126, 128, 130 disposed between the top reinforcing rib 122 and the bottom reinforcing rib 124. Each one of the plurality of intermediate reinforcing ribs 126, 128, 130 extends longitudinally and non-linearly between the first profile end 136 and the second profile. Adjacent intermediate reinforcing ribs 126, 128, 130 of the plurality of intermediate reinforcing ribs 126, 128, 130 converge with one another at the first profile end 136 and the second profile end 138 to define the non-uniform cross-section. The plurality of intermediate reinforcing ribs 126, 128, 130 includes a first intermediate reinforcing rib 126 disposed adjacent the top reinforcing rib 122, a second intermediate reinforcing rib 128 disposed adjacent the bottom reinforcing rib 124, and a third intermediate reinforcing rib 130 disposed between the first intermediate reinforcing rib 126 and the second intermediate reinforcing rib 128. As best shown in FIGS. 18-22, the plurality of pockets 140, 142, 144, 146, 148 includes a first pocket 140, having a generally rectangular cross-sectional shape, disposed between the top reinforcing rib 122 and the first intermediate reinforcing rib 126; a second pocket 142, having a rectangular cross-sectional shape, disposed between the second intermediate reinforcing rib 128 and the bottom reinforcing rib 124; a third pocket 144, having an elongated hexagonal cross-sectional shape, disposed between the first intermediate reinforcing rib 126 and the third intermediate reinforcing rib 130; a fourth pocket 146, having an elongated hexagonal cross-sectional shape, disposed between the third intermediate reinforcing rib 130 and the second intermediate reinforcing rib 128; and a pair of fifth pockets 148, having a triangular cross-sectional shape, each disposed adjacent respective the first profile end 136 and the second profile end 138 and between the converging portions 112, 114, 116, 118 of the intermediate reinforcing ribs 126, 128, 130.

As best illustrated in FIGS. 15-18, the front center portion 112 of the front panel 104 has a front center portion thickness $T_1$. The back center portion 116 of the back panel 106 has a back center portion thickness $T_2$ wherein the front center portion thickness $T_1$ is greater than the back center portion thickness $T_2$ of the back center portion 116. Each of the front side portions 114 has a front side portion thickness $T_3$ and each of the back side portions 118 has a back side portion thickness $T_4$ wherein the front side portion thickness $T_3$ is less than the back side portion thickness $T_4$ of the back side portions 118. The front center portion thickness $T_1$ is greater than the front side portion thickness $T_3$ and the back center portion thickness $T_2$ being less than the back side portion thickness $T_4$. In other words, at the center of the bumper beam 102, the front panel 104 is thick while the back panel 106 is thin. Because the center of the bumper must resist buckling during several testing events, an increase in the front panel 104 thickness, e.g., front center portion thickness $T_1$, is a very effective method of increasing local buckling performance. The rear side of the bumper beam 102, e.g., the back side portions 118, is in tension in the same test case and, therefore, local resistance is not required. On the other hand, near the first bumper beam end 108 and the second bumper beam end 110, the front panel 104 is thin and the back panel 106 is thick. Near the first bumper beam end 108 and the second bumper beam end 110, the front side portions 114 is not at risk of buckling and primarily react with the foam force. The back side portions 118 must effectively transfer the load to the crush cans and an increase in back panel 106 thickness, e.g., back side portion thickness $T_4$, is beneficial for transferring the load to the crush cans.

As best shown in FIGS. 15 and 17, the bumper beam 102 includes a pair of crush boxes 150 integrally cast with and extending outwardly from the back panel 106. In other words, the crush boxes 150 and the bumper beam 102 is a monolithic structure. Each of the crush boxes 150 extends outwardly from the back panel 106 to an attachment end 152 and tapering from the attachment end 152 to the back panel 106. Each of the crush boxes 150 includes a mounting plate 154, having a rectangular shape and integrally cast with the crush boxes 150. The mounting plate 154 extends outwardly from the attachment end 152 and defines a plurality of mounting holes 156 spaced from one another for securing the crush box 150 and the bumper beam 102 to a vehicle frame.

Figure 24:
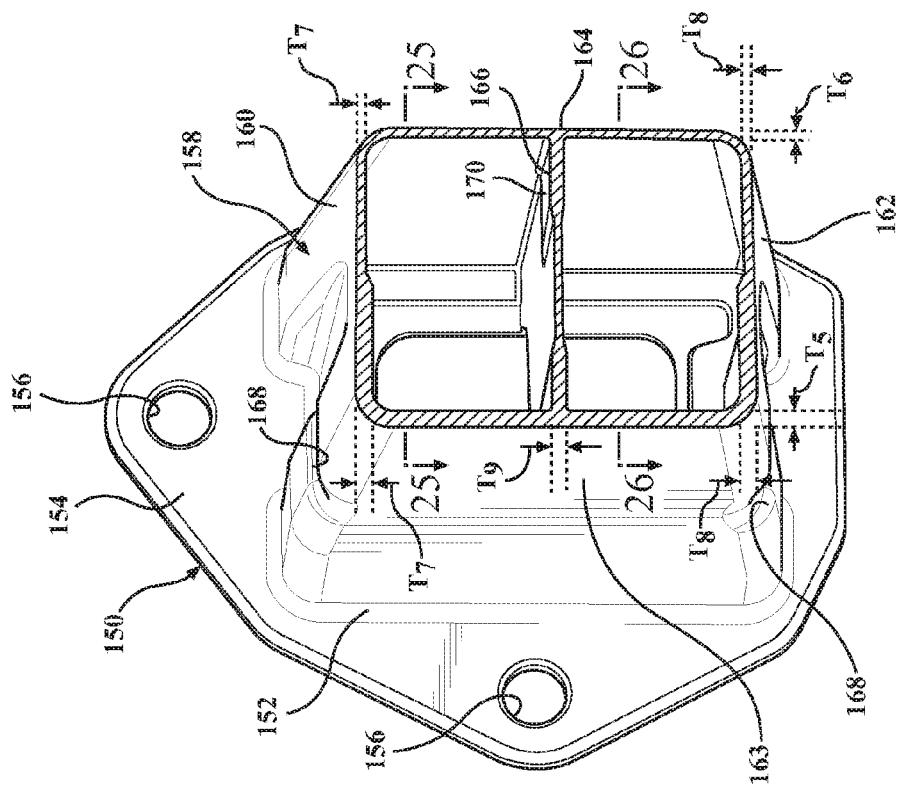
FIG. 24 is a perspective view of the crush box of the ninth embodiment of the bumper system.
Figure 23:
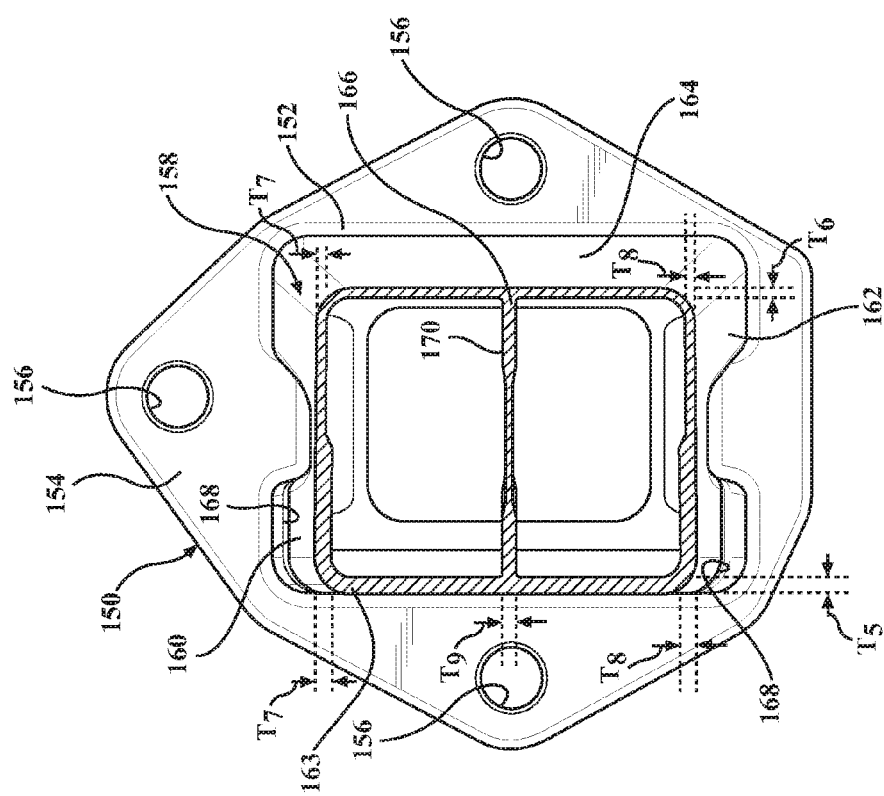
FIG. 23 is a front view of the crush box of the ninth embodiment of the bumper system.
Figure 25:
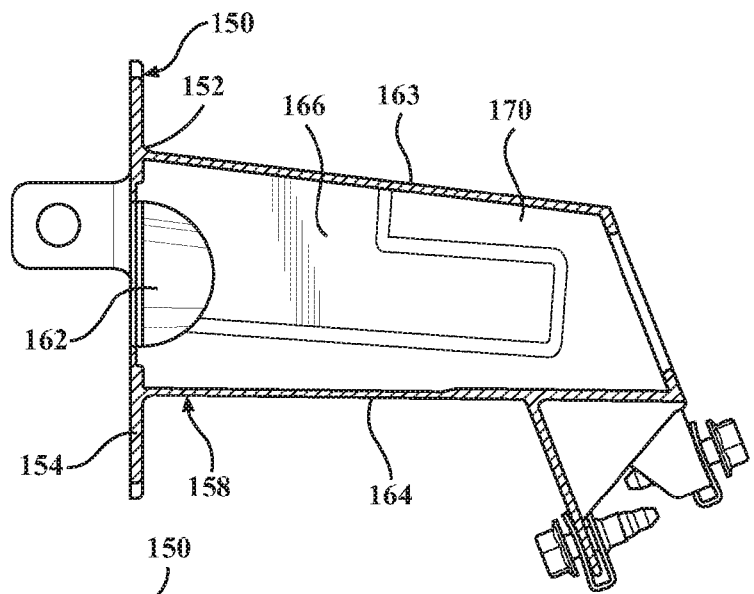
FIG. 25 is a cross-sectional top view of the crush box of the ninth embodiment of the bumper system along the lines 25-25 in FIG. 24.
Figure 26:
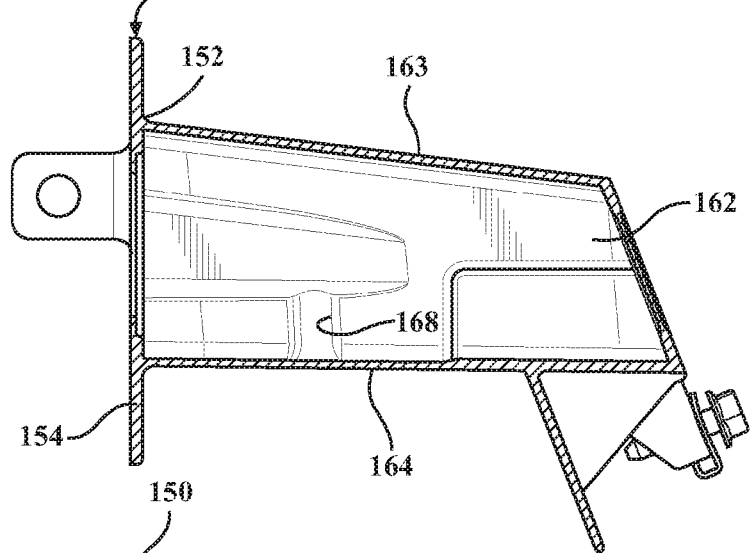
FIG. 26 is a cross-sectional top view of the crush box of the ninth embodiment of the bumper system along the lines 26-26 in FIG. 24.
Figure 27:
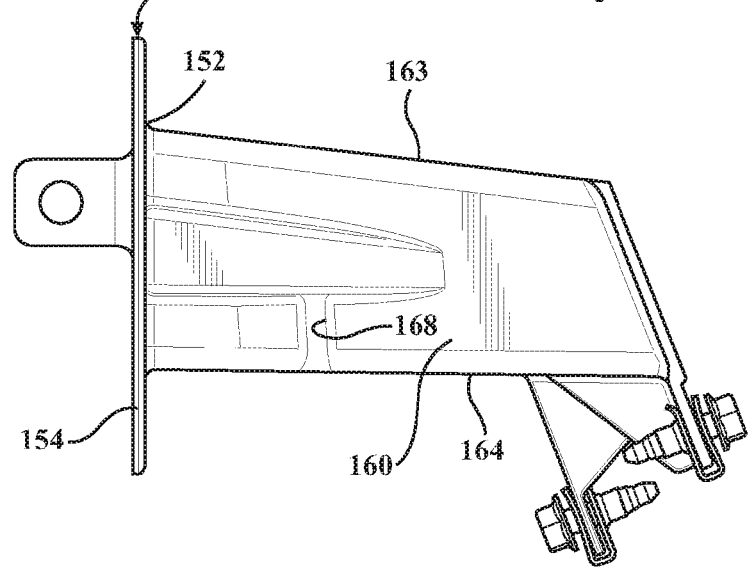
FIG. 27 is a top view of the crush box of the ninth embodiment of the bumper system.
Figure 28:
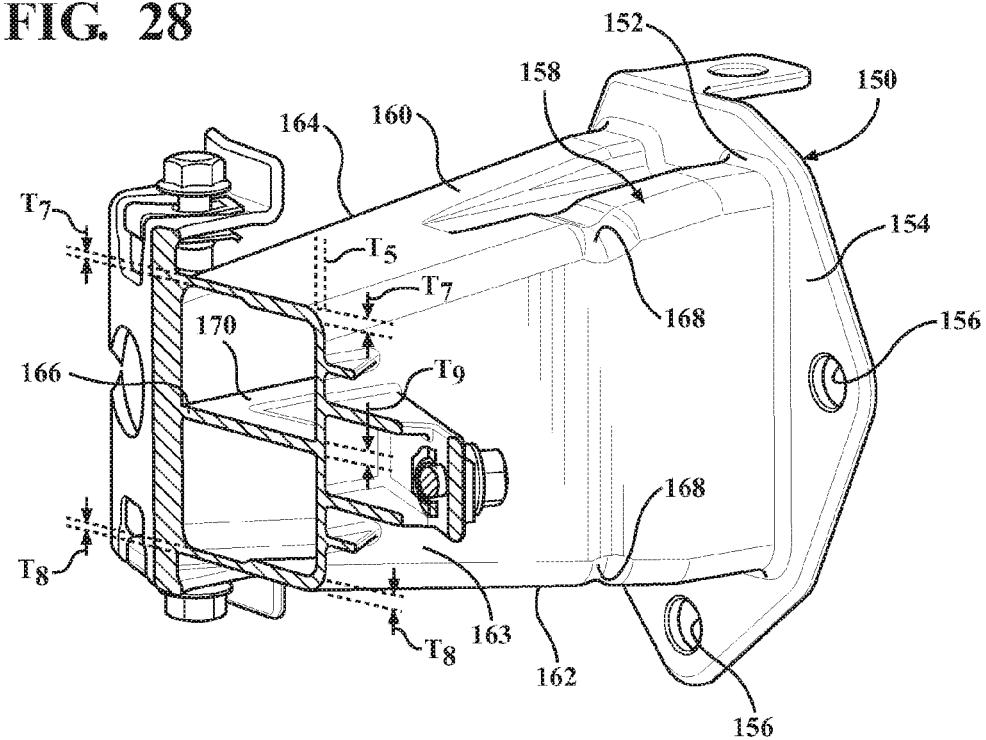
FIG. 28 is a perspective view of the crush box of the ninth embodiment of the bumper system.
Figure 29:
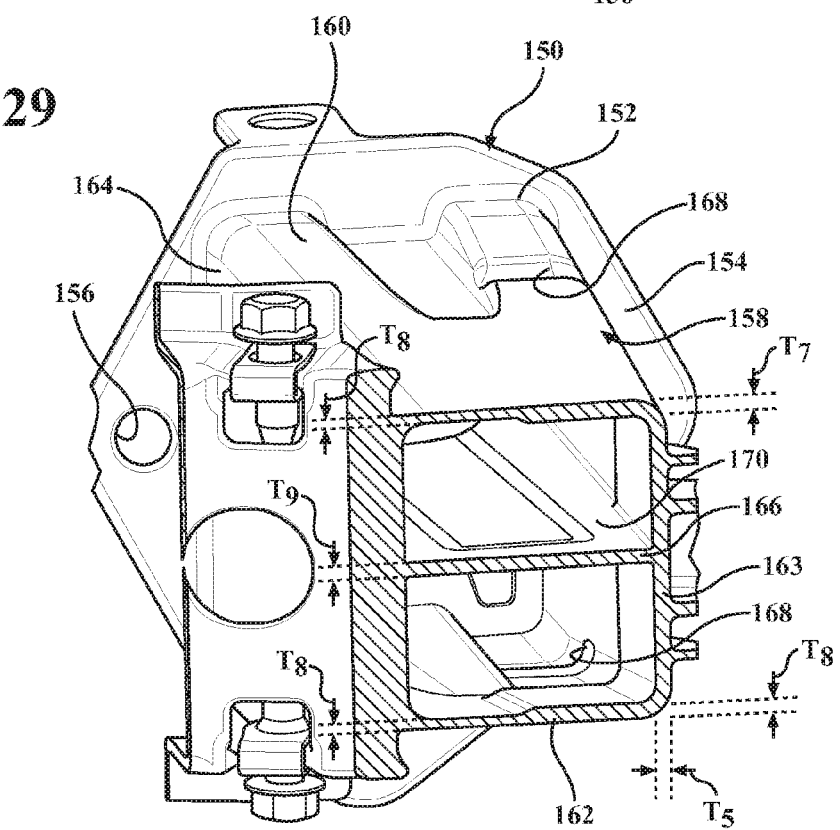
FIG. 29 is a perspective view of the crush box of the ninth embodiment of the bumper system.

As shown in FIGS. 23-24, each of the crush boxes 150 has a body 158 including a top wall 160, a bottom wall 162, and a pair of side walls 163, 164 extending between the top wall 160 and the bottom wall 162. The side walls 163, 164 include a first side wall 163 having a first side wall thickness $T_5$ and a second side wall 164 having a second side wall thickness $T_6$ and with the first side wall thickness $T_5$ being greater than the second side wall thickness $T_6$. As best shown in FIGS. 28 and 29, the top wall 160 has a variable top wall thickness $T_7$ between the first side wall 163 and second side wall 164. The bottom wall 162 has a variable bottom wall thickness $T_8$ between the first side wall 163 and second side wall 164. The variable top wall thickness $T_7$ is equal to the first side wall thickness $T_5$ adjacent the first side wall 163 and decreases to be equal to the second side wall thickness $T_6$ adjacent the second side wall 164. The variable bottom wall thickness $T_8$ is equal to the first side wall thickness $T_5$ adjacent the first side wall 163 and decreases to be equal to the second side wall thickness $T_6$ adjacent the second side wall 164.

Each of the crush boxes 150 further includes a reinforcing plate 166 integrally cast and extends in spaced relationship with the top wall 160 and the bottom wall 162 and between the pair of side walls 163, 164. The reinforcing plate 166 has a variable reinforcing plate thickness $T_9$ between the pair of side walls 163, 164. The reinforcing plate 166 includes at least one internal reinforcing rib 170 to define the variable reinforcing plate thickness $T_9$. The top wall 160 and the bottom wall 162 each define at least one buckle initiating grooves 168 integrally cast with the top wall 160 and the bottom wall 162 for allowing the crush boxes 150 to buckle and deform in response to a buckling force applied to the bumper beam 102.

It is another aspect of the present disclosure to provide a method for manufacturing a bumper system 100. The method includes the step of metal casting a bumper beam 102 having a front panel 104 and a back panel 106 extending in spaced relationship to one another between a first bumper beam end 108 and a second bumper beam end 110 and a plurality of reinforcing ribs 122, 124, 126, 128, 130 extending between the front panel 104 and the back panel 106 and defining a non-uniform cross-sectional profile 134 along at least a portion of the bumper beam 102. The step of metal casting includes a step of forming the front panel 104 including a front center portion 112 disposed between a pair of front side portions 114 and the back panel 106 including a back center portion 116 disposed between a pair of back side portions 118 with the front center portion 112 having a front center portion thickness $T_1$ being greater than a back center portion thickness $T_2$ of the back center portion 116, and each of the front side portions 114 having a front side portion thickness $T_3$ being less than a back side portion thickness $T_4$ of adjacent one of the back side portions 118. The step of metal casting also includes a step of forming a pair of crush boxes 150 integrally cast with and extending outwardly from the back side portions 118 of the back panel 106, each of the crush boxes 150 having a body 158 including a top wall 160 and a bottom wall 162 and a pair of side walls 163, 164 extending between the top wall 160 and the bottom wall 162, and a reinforcing plate 166 disposed n the crush box 150 in spaced relationship between the top wall 160 and the bottom wall 162 and extending between the pair of side walls 163, 164 connecting the side walls 163, 164 with one another. The step of metal casting further includes a step of forming at least one buckle initiating groove 168 on the top wall 160 and the bottom wall 162 of the crush box 150. The step of metal casting further includes forming at least one internal reinforcing rib 172 on the walls 160, 162, 163, 164 and the reinforcing plate 166 of the crush box 150.

It should be appreciated that various other components and/or combinations of components can comprise regions or portions of different alloys and more than two different regions or portions can extend along the metal cast bumper beam. It should also be appreciated that various alloys may be utilized including, but not limited to, aluminum-based, e.g., 5000, 6000, or 7000 series aluminum alloys, magnesium-based, and iron-based alloys.

Although not expressly shown in the Figures, one or both of the bumper beam or the crash box in any of the aforementioned embodiments of the bumper system can also be cast to incorporate various design features including but not limited to: head lamps, ambient air sensors, pedestrian brackets, collision avoidance sensors, a hood latch, pedestrian protection systems, horns, grilles, fog lamps, toe hooks, threaded inserts, and neoprene shock absorption materials. As such, the cast bumper system can incorporate design features and shapes that would otherwise have to be welded onto prior art bumper assemblies, or stretch bent into prior art bumper assemblies. Thus, the cast bumper system avoids the machining and welding operations that are required to incorporate these features into prior art bumper assemblies manufactured by way of extrusion, steel roll forming, hot stamping, or the like.

Although not expressly shown in the figures, the cast bumper beam in any of the aforementioned embodiments of the bumper system can also be cast to have a "U"-shape or "C"-shape extending along a portion of its length.

Although not expressly shown in the Figures, one or both of the bumper beam or the crash box in any of the aforementioned embodiments of the bumper system can also include absorption inserts placed anywhere within or along the bumper system.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A bumper system comprising:
    a bumper beam being cast from metal and having a front panel and a back panel extending in spaced relationship to one another between a first bumper beam end and a second bumper beam end,
    a plurality of reinforcing ribs integrally cast with said bumper beam and extending between said front panel and said back panel for providing structural rigidity to said bumper beam, and
    said plurality of reinforcing ribs including a top reinforcing rib and a bottom reinforcing rib disposed in spaced relationship to one another and extending longitudinally and linearly between a first profile end disposed relative to said first bumper beam end and a second profile end disposed relative to said second bumper beam end and at least one intermediate rib disposed between said top and bottom reinforcing rib and extending longitudinally and non-linearly between said first and second profile ends to define a non-uniform cross-sectional profile of said bumper beam taken along a plane disposed perpendicular to said plurality of reinforcing ribs and extending between said first and second profile ends.

2. The system as set forth in claim 1 wherein said plurality of reinforcing ribs define a plurality of pockets varying in quantity as said plurality of reinforcing ribs extend longitudinally between said first profile end and said second profile end.

3. The system as set forth in claim 2 wherein said at least one intermediate rib includes a plurality of intermediate reinforcing ribs disposed between said top reinforcing rib and said bottom reinforcing rib with each one of said plurality of intermediate reinforcing ribs extending longitudinally and non-linearly between said first and second profile end and adjacent intermediate reinforcing ribs of said plurality of intermediate reinforcing ribs converging with one another at said first profile end and said second profile end.

4. The system as set forth in claim 3 wherein said plurality of intermediate reinforcing ribs includes a first intermediate reinforcing rib disposed adjacent said top reinforcing rib, a second intermediate reinforcing rib disposed adjacent said bottom reinforcing rib, and a third intermediate reinforcing rib disposed between said first and said second intermediate reinforcing rib, and wherein said plurality of pockets includes a first pocket of generally rectangular cross-sectional shape disposed between said top reinforcing rib and said first intermediate reinforcing rib, a second pocket of generally rectangular cross-sectional shape disposed between said second intermediate reinforcing rib and said bottom reinforcing rib, a third pocket of elongated hexagonal cross-sectional shape disposed between said first intermediate reinforcing rib and said third intermediate reinforcing rib, a fourth pocket of elongated hexagonal cross-sectional shape disposed between said third intermediate reinforcing rib and said second intermediate reinforcing rib, a pair of fifth pockets of triangular cross-sectional shape each disposed adjacent respective said first and second profile ends and between said converging portions of said intermediate reinforcing ribs.

5. The system as set forth in claim 1 further comprising:
said front panel of said bumper beam including a front center portion disposed between a pair of front side portions,
said back panel of said bumper beam including a back center portion disposed between a pair of back side portions,
said front center portion has a front center portion thickness being greater than a back center portion thickness of said back center portion, and
each of said front side portions having a front side portion thickness being less than a back side portion thickness of said back side portions.

6. The system as set forth in claim 5 wherein said front center portion thickness is greater than said front side portion thickness and said back center portion thickness being less than said back side portion thickness.

7. The system as set forth in claim 1 further including a pair of crush boxes integrally cast with and extending outwardly from said back panel.

8. The system as set forth in claim 7 wherein each of said crush boxes having a body including a top wall and a bottom wall and a pair of side walls extending between said top wall and said bottom wall, and
said side walls including a first side wall having a first side wall thickness and a second side wall having a second side wall thickness and with said first side wall thickness being greater than said second side wall thickness.

9. The system as set forth in claim 8 wherein said top wall has a variable top wall thickness between said first and second side walls and said bottom wall has a variable bottom wall thickness between said first and second side walls.

10. The system as set forth in claim 9 wherein said variable top wall thickness is equal to said first side wall thickness adjacent said first side wall and decreases to be equal to said second side wall thickness adjacent said second side wall, and said variable bottom wall thickness is equal to said first side wall thickness adjacent said first side wall and decreases to be equal to said second side wall thickness adjacent said second side wall.

11. The system as set forth in claim 8 wherein each of said crush boxes further includes a reinforcing plate integrally cast extends in spaced relationship with said top wall and said bottom wall and between said pair of side walls.

12. The system as set forth in claim 11 wherein said reinforcing plate has a variable reinforcing plate thickness between said pair of side walls.

13. The bumper system as set forth in claim 12 wherein said reinforcing plate includes at least one internal reinforcing rib to define said variable reinforcing plate thickness.

14. The system as set forth in claim 8 wherein said top wall and said bottom wall each define at least one buckle initiating grooves integrally cast with said top wall and said bottom wall.

15. A bumper system comprising:
a bumper beam being cast from metal and having a front panel and a back panel extending in spaced relationship to one another between a first bumper beam end and a second bumper beam end,
said front panel of said bumper beam including a front center portion disposed between a pair of front side portions,
said back panel of said bumper beam including a back center portion disposed between a pair of back side portions,
said front center portion having a front center portion thickness being greater than a back center portion thickness of said back center portion, and each of said front side portions having a front side portion thickness being less than a back side portion thickness of adjacent one of said back side portions;
a plurality of reinforcing ribs integrally cast with said bumper beam and extending between said front panel and said back panel for providing structural rigidity to said bumper beam; and
said plurality of reinforcing ribs including a top reinforcing rib and a bottom reinforcing rib disposed in spaced relationship to one another and extending longitudinally and linearly between a first profile end disposed relative to said first bumper beam end and a second profile end disposed relative to said second bumper beam end and at least one intermediate rib disposed between said top and bottom reinforcing rib and extending longitudinally and non-linearly between said first and second profile ends to define a non-uniform cross-sectional profile of said bumper beam taken along a plane disposed perpendicular to said plurality of reinforcing ribs and extending between said first and second profile ends.

16. The system as set forth in claim 15 wherein said front center portion thickness is greater than said front side portion thickness of said front side portions and said back center portion thickness being less than said back side portion thickness of said back side portions.

17. The system as set forth in claim 15 wherein said plurality of reinforcing ribs define a plurality of pockets varying in quantity as said plurality of reinforcing ribs extend longitudinally between said first profile end disposed and said second profile end.

18. The system as set forth in claim 17 wherein said at least one intermediate rib includes a plurality of intermediate reinforcing ribs disposed between said top reinforcing rib and said bottom reinforcing rib with each one of said plurality of intermediate reinforcing ribs extending longitudinally and non-linearly between said first and second profile end and adjacent intermediate reinforcing ribs of said plurality of intermediate reinforcing ribs converging with one another at said first profile end and said second profile end to define said non-uniform cross-section.

19. The system as set forth in claim 18 wherein said plurality of intermediate reinforcing ribs includes a first intermediate reinforcing rib disposed adjacent said top reinforcing rib, a second intermediate reinforcing rib disposed adjacent said bottom reinforcing rib, and a third intermediate reinforcing rib disposed between said first and said second intermediate reinforcing rib, and wherein said plurality of pockets includes a first pocket of generally rectangular cross-sectional shape disposed between said top reinforcing rib and said first intermediate reinforcing rib, a second pocket of generally rectangular cross-sectional shape disposed between said second intermediate reinforcing rib and said bottom reinforcing rib, a third pocket of elongated hexagonal cross-sectional shape disposed between said first intermediate reinforcing rib and said third intermediate reinforcing rib, a fourth pocket of elongated hexagonal cross-sectional shape disposed between said third intermediate reinforcing rib and said second intermediate reinforcing rib, a pair of fifth pockets of triangular cross-sectional shape each disposed adjacent respective said first and second profile ends and between said converging portions of said intermediate reinforcing ribs.

20. A method for manufacturing a bumper system, said method comprising:

metal casting a bumper beam having a front panel and a back panel extending in spaced relationship to one another between a first bumper beam end and a second bumper beam end and a plurality of reinforcing ribs extending between the front panel and the back panel and defining a non-uniform cross-sectional profile along at least a portion of the bumper beam; and metal casting a pair of crush boxes integrally with the bumper beam extending outwardly from said back side portions of said back panel, each of said crush boxes having a body including at least one buckle initiating groove on both a top wall and a bottom wall and at least one internal reinforcing rib on a pair of side walls extending between said top wall and said bottom wall, and at least one reinforcing rib on a reinforcing plate disposed on each of said crush boxes in spaced relationship between said respective top wall and said bottom wall and extending between said respective pair of side walls connecting said side walls with one another.

21. The method as set forth in claim 20 wherein said step of metal casting the bumper beam further including a step of forming the front panel including a front center portion disposed between a pair of front side portions and the back panel including a back center portion disposed between a pair of back side portions with the front center portion having a front center portion thickness being greater than a back center portion thickness of the back center portion, and each of the front side portions having a front side portion thickness being less than a back side portion thickness of adjacent one of the back side portions.

* * * * *